(12) United States Patent
Watanabe et al.

(10) Patent No.: US 6,240,266 B1
(45) Date of Patent: *May 29, 2001

(54) PROCESS CARTRIDGE AND DRUM MOUNT FOR PHOTOSENSITIVE DRUM

(75) Inventors: Kazushi Watanabe, Mishima; Yoshihiro Ito, Yokohama; Toshiharu Kawai, Susono, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 7 days.

This patent is subject to a terminal disclaimer.

(21) Appl. No.: 08/819,772

(22) Filed: Mar. 18, 1997

(30) Foreign Application Priority Data

| Mar. 21, 1996 | (JP) | 8-064105 |
| Sep. 26, 1996 | (JP) | 8-277532 |
| Mar. 14, 1997 | (JP) | 9-082344 |

(51) Int. Cl.$^7$ .................................................. G03G 15/00
(52) U.S. Cl. ............................................ 399/117; 399/167
(58) Field of Search ........................... 399/117, 167, 399/116; 403/361, 383; 492/15; 464/179, 182, 185

(56) References Cited

U.S. PATENT DOCUMENTS

| 3,213,719 | 10/1965 | Kloack | 81/71 |
| 3,536,397 | * 10/1970 | Wagner . | |
| 3,734,548 | * 5/1973 | Kieves . | |
| 3,815,380 | * 6/1974 | Esmay | 464/173 |
| 4,025,210 | * 5/1977 | Johnson | 403/240 |
| 4,454,922 | 6/1984 | Jamison et al. | 175/323 |
| 4,621,919 | * 11/1986 | Nitanda et al. | 399/117 |
| 4,922,297 | * 5/1990 | Kondo | 399/117 |
| 4,975,743 | 12/1990 | Surti | 355/211 |
| 4,989,037 | * 1/1991 | Nagatsuna | 399/167 |
| 5,019,861 | 5/1991 | Surti | 355/200 |
| 5,095,335 | 3/1992 | Watanabe et al. | 355/210 |

(List continued on next page.)

FOREIGN PATENT DOCUMENTS

| 0251693 | 1/1988 | (EP) . |
| 0735432 | 10/1996 | (EP) . |
| 2214609 | 9/1989 | (GB) . |

*Primary Examiner*—Robert Beatty
(74) *Attorney, Agent, or Firm*—Fitzpatrick, Cella, Harper & Scinto

(57) ABSTRACT

An electrophotographic image forming apparatus for forming an image on a recording material includes an electrophotographic photosensitive drum, a charger for charging the photosensitive drum, a developer for developing a latent image formed on the photosensitive drum into a toner image, a transferrer for transferring the toner image onto the recording material, a fixer for fixing the toner image on the recording material, a motor, a main assembly side gear for receiving a driving force from the motor, and a hole formed substantially at a center of the gear. The hole has a polygonal cross-section. The apparatus also includes a projection provided at a longitudinal end of the photosensitive drum. When the main assembly side gear rotates with the hole and projection engaged with each other, a rotational driving force is transmitted from the gear to the photosensitive drum through the hole and the projection with the projection is pulled into the hole. An end portion of a shaft having the projection and a surface defining the hole contact each other so that the process cartridge is positioned in place in a longitudinal direction of the photosensitive drum relative to the main assembly. The apparatus also includes a mover for imparting relative movement between the hole and the photosensitive drum to engage the projection with the hole.

91 Claims, 22 Drawing Sheets

U.S. PATENT DOCUMENTS

| | | | |
|---|---|---|---|
| 5,132,728 | * 7/1992 | Suzaki et al. | 399/167 |
| 5,151,734 | 9/1992 | Tsuda et al. | 355/200 |
| 5,280,224 | 1/1994 | Sagara | 318/265 |
| 5,284,455 | * 2/1994 | Kuribayashi | 464/105 |
| 5,345,294 | 9/1994 | Nomura et al. | 355/200 |
| 5,402,207 | * 3/1995 | Michlin | 399/117 |
| 5,452,064 | 9/1995 | Inomata | 355/271 |
| 5,463,446 | 10/1995 | Watanabe et al. | 355/200 |
| 5,597,261 | * 1/1997 | Hayashi | 403/354 |
| 5,602,623 | 2/1997 | Nishibata et al. | 399/111 |
| 5,608,509 | 3/1997 | Shirai et al. | 399/351 |
| 5,659,847 | 8/1997 | Tsuda et al. | 399/113 |
| 5,740,500 | * 4/1998 | Hashimoto | 399/114 |
| 5,749,028 | * 5/1998 | Damji et al. | 399/117 |
| 5,768,658 | * 6/1998 | Watanabe et al. | 399/111 |
| 5,903,803 | * 5/1999 | Kawai et al. | 399/116 |

* cited by examiner

PROCESS CARTRIDGE AND DRUM MOUNT FOR PHOTOSENSITIVE DRUM

FIELD OF THE INVENTION AND RELATED ART

The present invention relates to a process cartridge and an electrophotographic image forming apparatus. Here, the term electrophotographic image forming apparatus refers to an apparatus using an electrophotographic image formation type process to form an image on a recording medium. Examples of the electrophotographic image forming apparatus include an electrophotographic copying machine, an electrophotographic printer (laser beam printer, LED printer or the like), a facsimile device and a word processor.

Here, the process cartridge may be a cartridge which is detachably mountable to a main assembly of an image forming apparatus and which contains as a unit an electrophotographic photosensitive member and at least one of process means such as charging means, developing means, cleaning means, or the like. The process cartridge may be a cartridge which is detachably mountable to a main assembly of an image forming apparatus and which contains as a unit an electrophotographic photosensitive member and a process means, such as charging means, developing means, cleaning means, or the like. The process cartridge may be a cartridge which is detachably mountable to a main assembly of an image forming apparatus by a user and which contains as a unit an electrophotographic photosensitive member and developing means. Since the process cartridge is detachably mountable relative to the main assembly of the device, the maintenance of the device is easy.

An electrophotographic image forming apparatus using the electrophotographic image formation type is such that a latent image is formed by selectively exposing the electrophotographic photosensitive member uniformly charged by charging means to image information light. The latent image is developed with toner by a developing means into a toner image. The toner image thus formed is transferred onto a recording medium by transferring means to form an image on the recording material.

When the process cartridge is mounted to the main assembly of the image forming apparatus, the process cartridge position is desirably precise.

SUMMARY OF THE INVENTION

Accordingly, it is a principal object of the present invention to provide a process cartridge and an electrophotographic image forming apparatus, wherein when a process cartridge is mounted to the main assembly of the apparatus, the process cartridge can be correctly positioned with respect to the main assembly of the apparatus.

It is another object of the present invention to provide a process cartridge and an electrophotographic image forming apparatus, wherein when the process cartridge is mounted to the main assembly, the process cartridge is correctly positioned with respect to the main assembly of the apparatus in the longitudinal direction of the photosensitive drum.

It is a further object of the present invention to provide a process cartridge and an electrophotographic image forming apparatus, wherein when the process cartridge is mounted to the main assembly of the apparatus, a photosensitive drum can be rotated through a coupling.

It is a further object of the present invention to provide a process cartridge and an electrophotographic image forming apparatus, wherein the position of the process cartridge relative to the main assembly of the apparatus in the longitudinal direction of the photosensitive drum is determined by the abutment between an end portion of a shaft having a projection and a surface defining a hole.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiments of the present invention will be described in conjunction with the accompanying drawings.

Embodiment 1

Referring to FIG. 1 to FIG. 10, a description will be provided as to a process cartridge and an electrophotographic image forming apparatus to which it is detachably mountable according to embodiment 1. In the following description, the general arrangement of the process cartridge and the electrophotographic image forming apparatus usable therewith will be first described referring to FIG. 1 to FIG. 6, and then the structure of a coupling of a driving force transmission mechanism between the process cartridge and the image forming apparatus will be described, referring to FIG. 7 to FIG. 10.

{General Arrangement}

Figure 1:
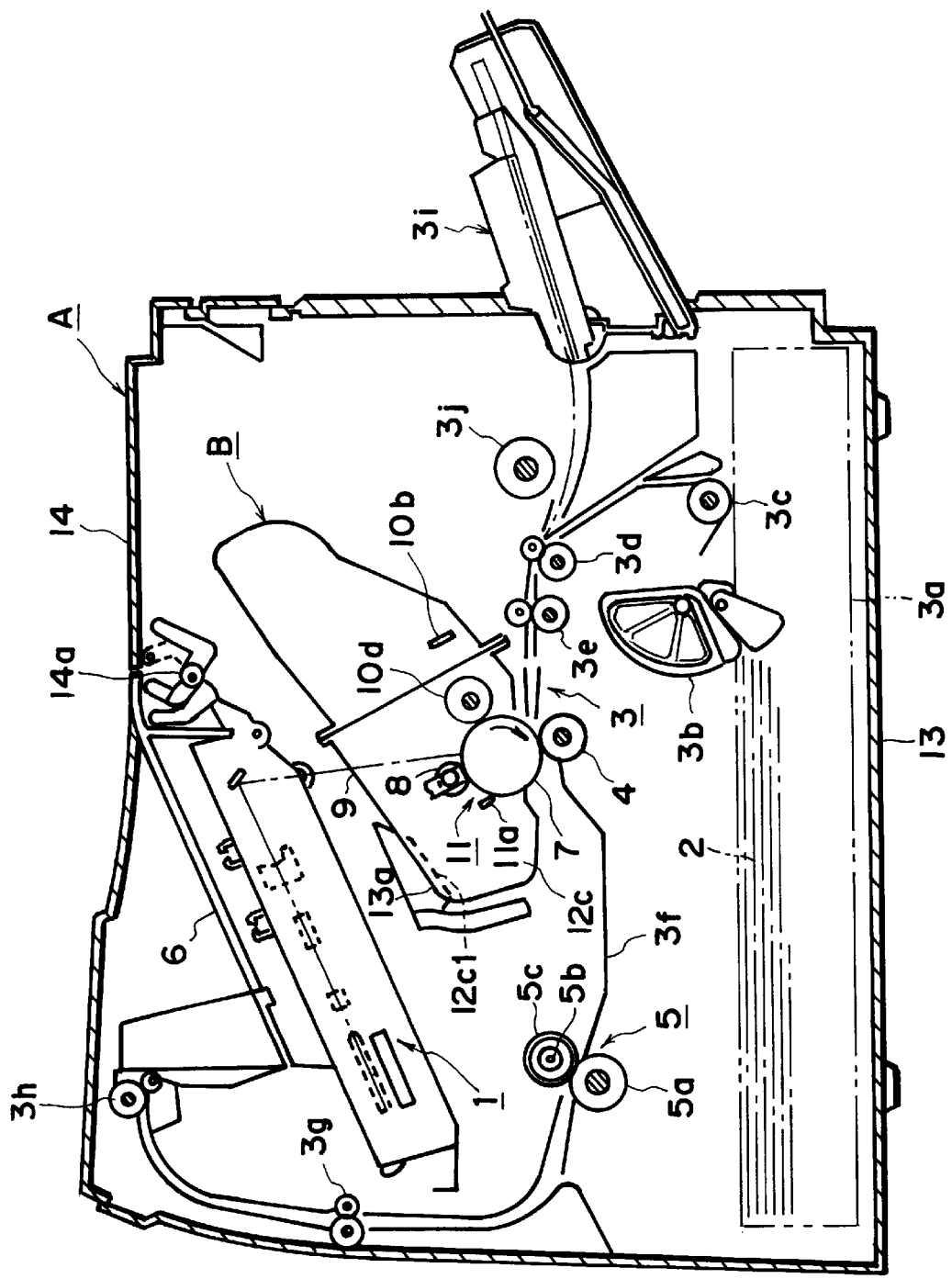
FIG. 1 is a cross-sectional view of an electrophotographic image forming apparatus according to an embodiment of the present invention.
Figure 2:
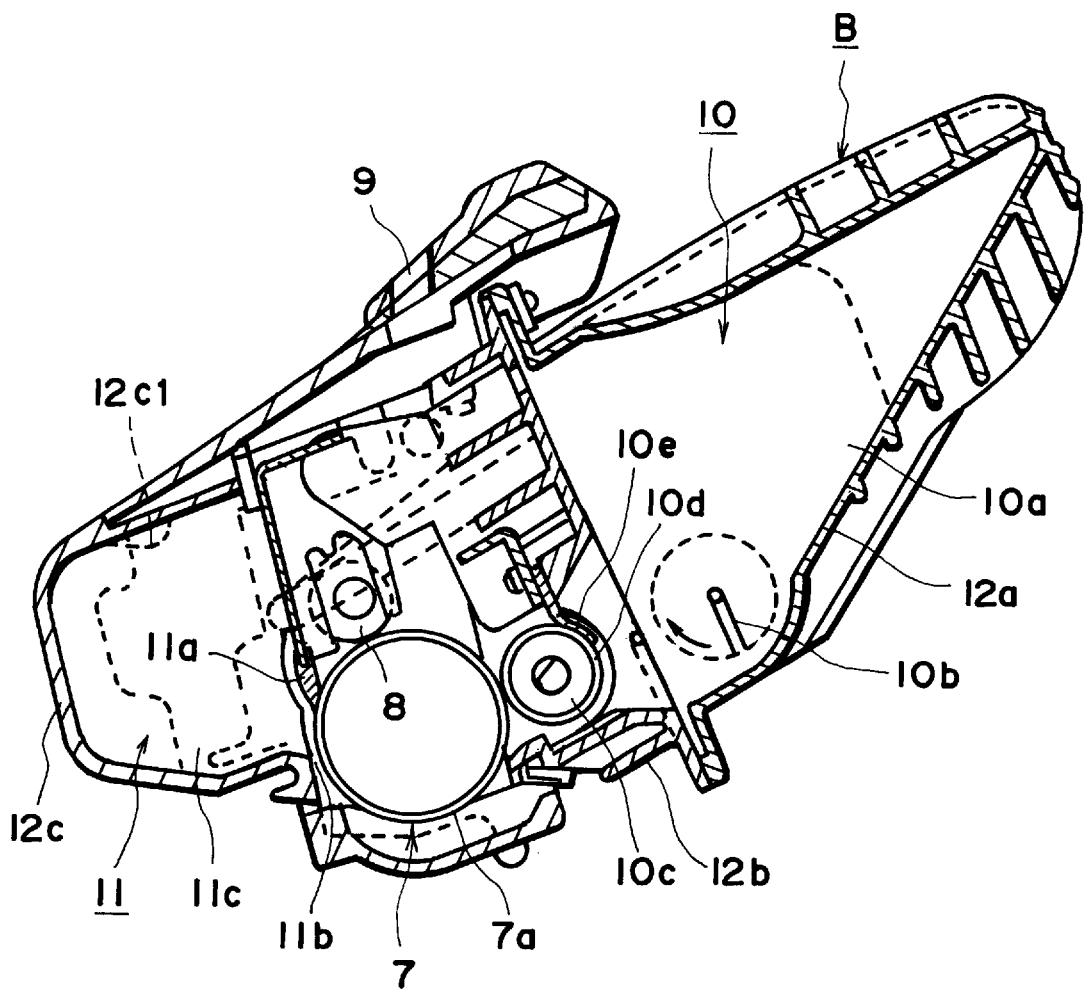
FIG. 2 is a cross-sectional view of a process cartridge according to an embodiment of the present invention.
Figure 3:
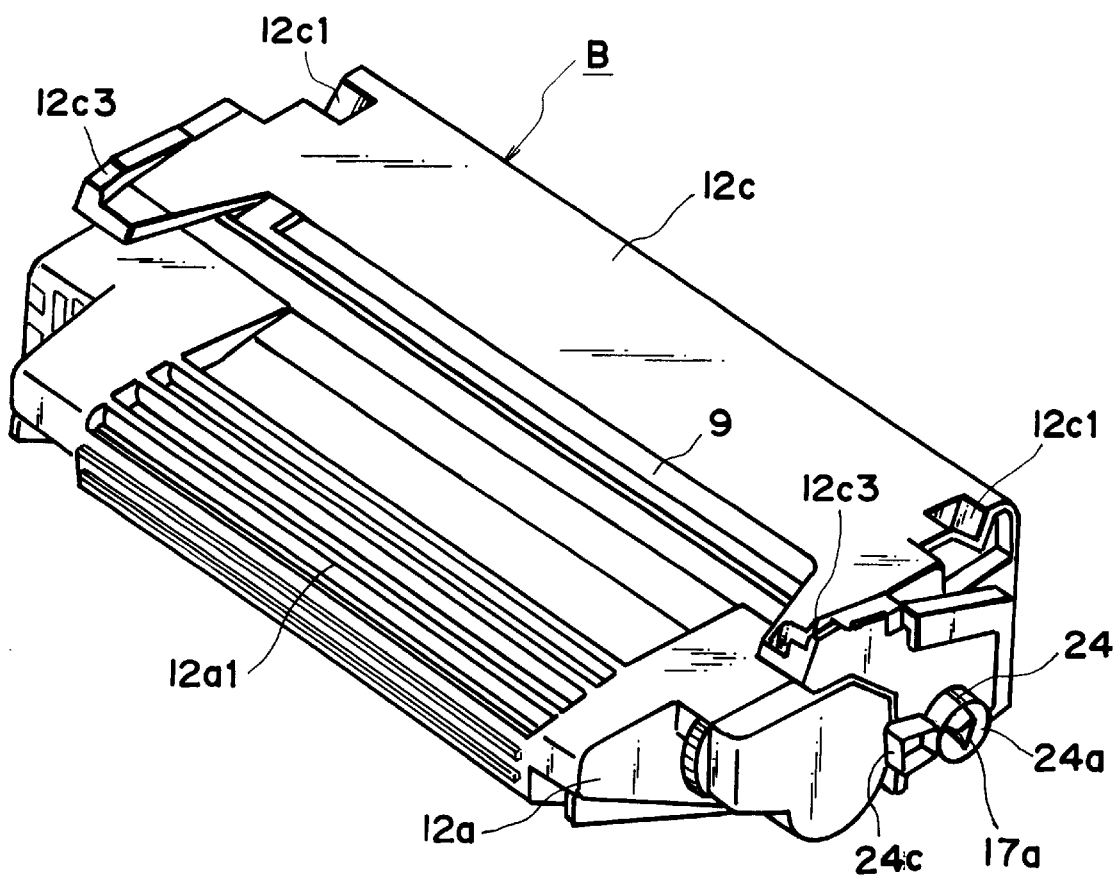
FIG. 3 is perspective view a process cartridge according to an embodiment of the present invention.
Figure 4:
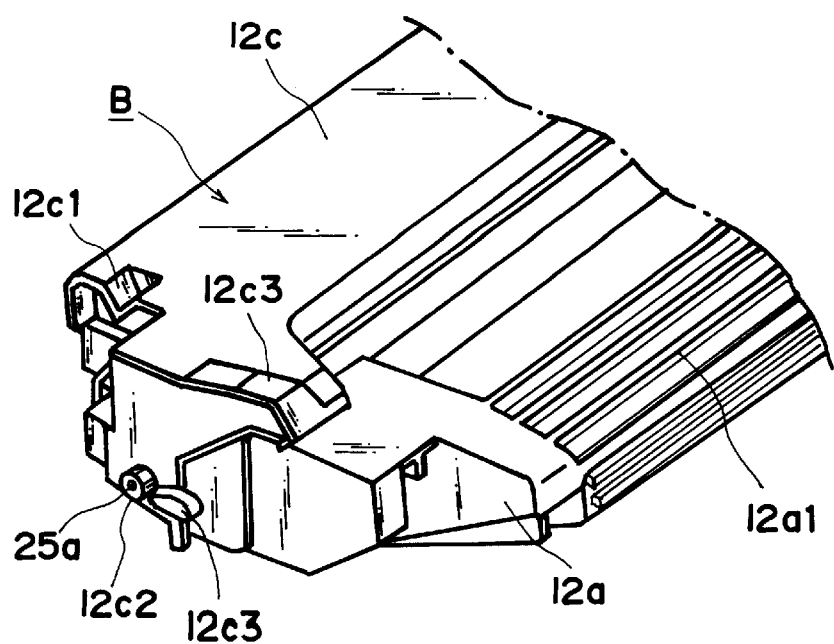
FIG. 4 is a perspective view of a process cartridge according to an embodiment of the present invention.
Figure 5:
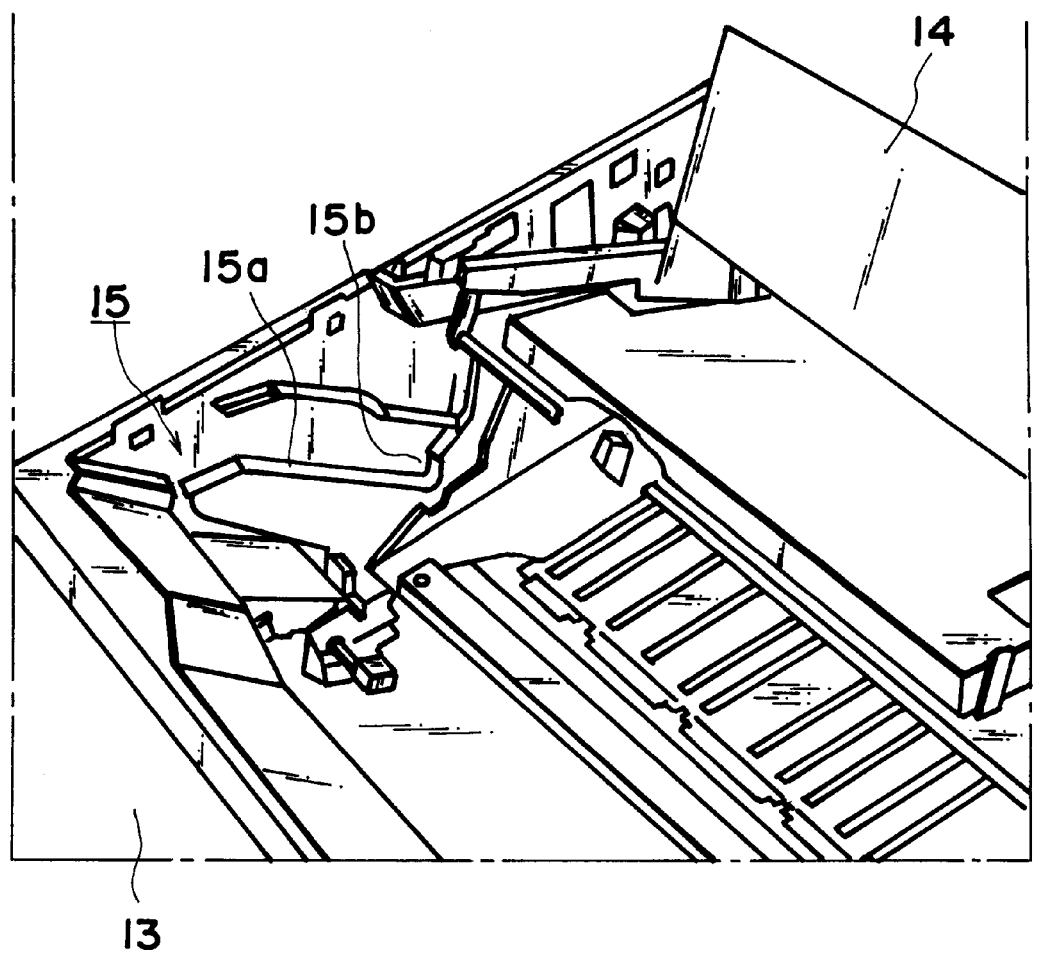
FIG. 5 is a perspective view of a process cartridge mounting portion of a main assembly of an electrophotographic image forming apparatus according to an embodiment of the present invention.
Figure 6:
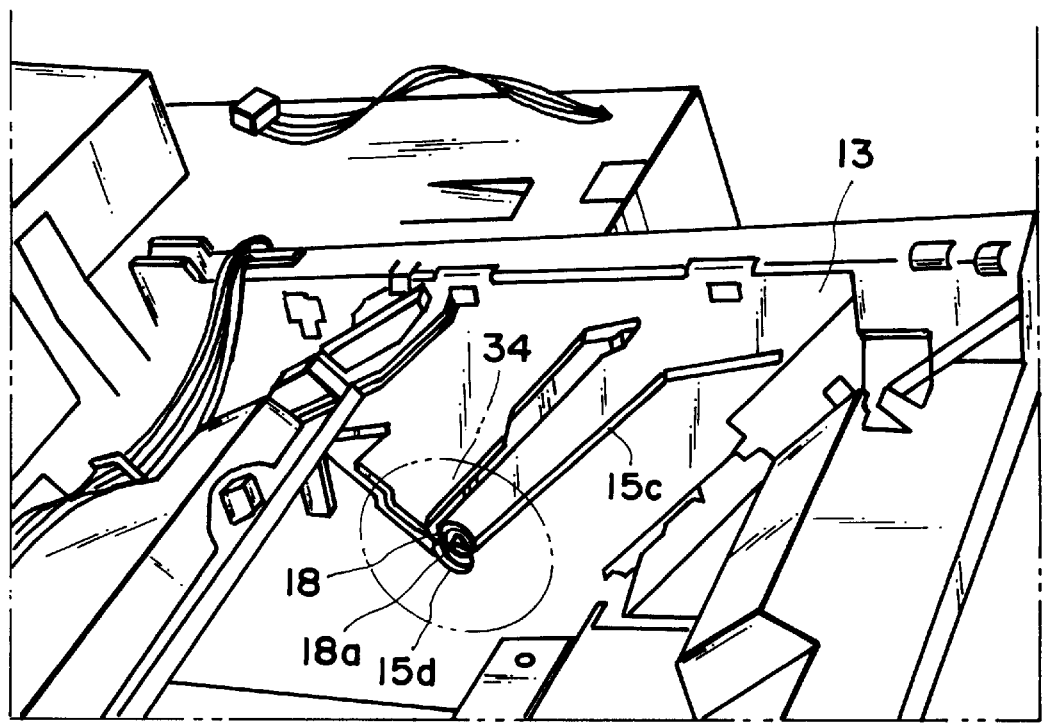
FIG. 6 is a perspective view of a process cartridge mounting portion of a main assembly of an electrophotographic image forming apparatus according to an embodiment of the present invention.

FIG. 1 is a schematic view of the electrophotographic image forming apparatus A to which the process cartridge is mounted; FIG. 2 is a cross-sectional view of the process cartridge B; FIGS. 3 and 4 are perspective views of outer appearance of the process cartridge; and FIGS. 5 and 6 illustrate device structures for mounting the process cartridge to the main assembly of the device.

In this electrophotographic image forming apparatus (laser beam printer in the embodiment), as shown in FIG. 1, an electrophotographic photosensitive member 7 of a drum configuration is exposed to a laser beam based on image information supplied from an optical system 1 so that a latent image is formed on the photosensitive member, and the latent image is developed with toner into a toner image. In synchronism with the formation of the toner image, a recording medium 2 (recording sheet or the like) is fed from a feeding cassette 3a by transporting means 3 comprising pick-up rollers 3b, feeding rollers 3c, feeding rollers 3d, registration rollers 3e or the like. The toner image formed on the photosensitive drum 7 is transferred onto the recording medium 2 by voltage application to the transfer roller 4 as transferring means. The recording medium 2 is guided by a guide plate 3f to a fixing means 5. The fixing means 5 comprises a fixing-roller 5c comprising a driving roller 5a and a heater 5b, and applies heat and pressure to the recording medium 2 to fix the transferred toner image onto the recording medium 2. The recording medium 2 is fed by the discharging rollers 3g and 3h, and is discharged to the discharging portion 6 through a reversion feeding path. In the image forming apparatus A, a manual sheet feeding operation is possible using a-manual feed tray and roller 3j.

The process cartridge B contains the electrophotographic photosensitive member and at least one process means. The process means includes, for example, charging means for charging the electrophotographic photosensitive member, developing means for developing the latent image on the electrophotographic photosensitive member, and cleaning means for removing the residual toner from the surface of the electrophotographic photosensitive member.

The process cartridge B of this example contains a photosensitive drum 7, the charging roller 8, the exposure opening 9, and the developing means 10, as shown. The electrophotographic photosensitive drum 7 in the process cartridge B is rotated through a coupling mechanism by the main assembly 13 of the device, as will be described hereinafter. The surface of the photosensitive drum is subjected to uniform charging by the voltage application to the charging roller 8 which is a charging means, and the information light from the optical system 1 is projected onto the photosensitive drum 7 through an exposure opening 9 for a latent image, which is developed by the developing means 10.

In the developing means 10, the toner in a toner accommodating portion 10a is fed out by rotation of a feeding member 10b. A developing roller 10d containing a fixed magnet 10c is rotated so that a toner layer having triboelectric charge provided by a development blade 10e is formed on the surface of the developing roller 10d. The toner is transferred to the photosensitive drum 7 in accordance with the latent image to form the toner image (visualization). The toner image is transferred onto the recording medium 2 by the application of the voltage of the opposite polarity from the toner image to the transfer roller 4 provided in the main assembly 13 of the device. The photosensitive drum 7 after transfer is cleaned by the cleaning means 11 so that the residual toner is removed. More particularly, the toner is scraped off by the cleaning blade 11a. The toner thus removed is collected in a residual toner container 11c by a receptor sheet 11b.

The charging roller 8 contacts the photosensitive drum 7 and is driven by the photosensitive drum 7. The cleaning blade 11a is in contact with the photosensitive drum 7.

The process cartridge B comprises a toner frame 12a having a toner accommodating portion 10a accommodating toner and a developing frame 12b supporting a developing member such as a developing roller 10d, which frames are welded together (ultrasonic welding in this example) to form a developing unit. This developing unit is swingably coupled with a cleaning frame 12c supporting the photosensitive drum 7, the charging roller 8, the cleaning means 11 and the like. The process cartridge B is mounted to a cartridge mounting means of the main assembly 13 of the device by an user in a direction crossing with a longitudinal direction of the photosensitive drum 7 (FIGS. 5 and 6). The cleaning frame 12c is provided with mounting guides 12c4 adjacent a bearing 12c2. The bearing 24 (projection 24a) mounted to the cleaning frame 12c is provided with a guide 24c. The bearing 24, the projection 24a, and the guide 24c are integrally molded. The mounting guides 24c is guided by guides 15a 15b when the process cartridge B is mounted.

As cartridge mounting means, as shown in FIG. 5, cartridge mounting guiding members 15 are mounted opposed to each other on left and right sides of a cartridge mounting space of the main assembly 13 (one side in FIG. 5 and the other side in FIG. 6). The guiding members 15 have guide portions 15a and 15c opposed to each other to function as guides when the process cartridge B is pushed into the main assembly. The process cartridge is inserted while bosses or the like projected from opposite longitudinal ends of the cartridge frame are guided by the guide portions 15a and 15c. When the process cartridge B is to be mounted to the main assembly 13, a cover 14, which is openable about a shaft 14a, is opened. By closing the openable cover 14, the process cartridge B is correctly mounting to the image forming apparatus A. When the process cartridge B is taken out from the main assembly 13, the openable cover 14 is opened.

When the process cartridge B is mounted to the image forming apparatus A, the cartridge side coupling and the main assembly side coupling are combined in interrelation with the closing operation of the openable cover 14, as will be described hereinafter, so that the photosensitive drum 7 and the like can receive the driving force from the main assembly.

{Coupling and Driving Structure}

A description will be provided as to the structure of the coupling means which is a driving force transmission mechanism for transmitting the driving force to the process cartridge B from the main assembly 13 of the image forming apparatus.

Figure 7:
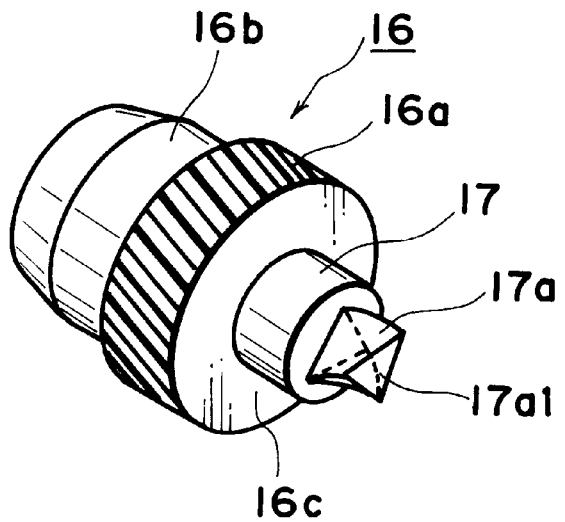
FIG. 7 is a perspective view of a drum flange (driving force transmission part) according to an embodiment of the present invention.
Figure 8:
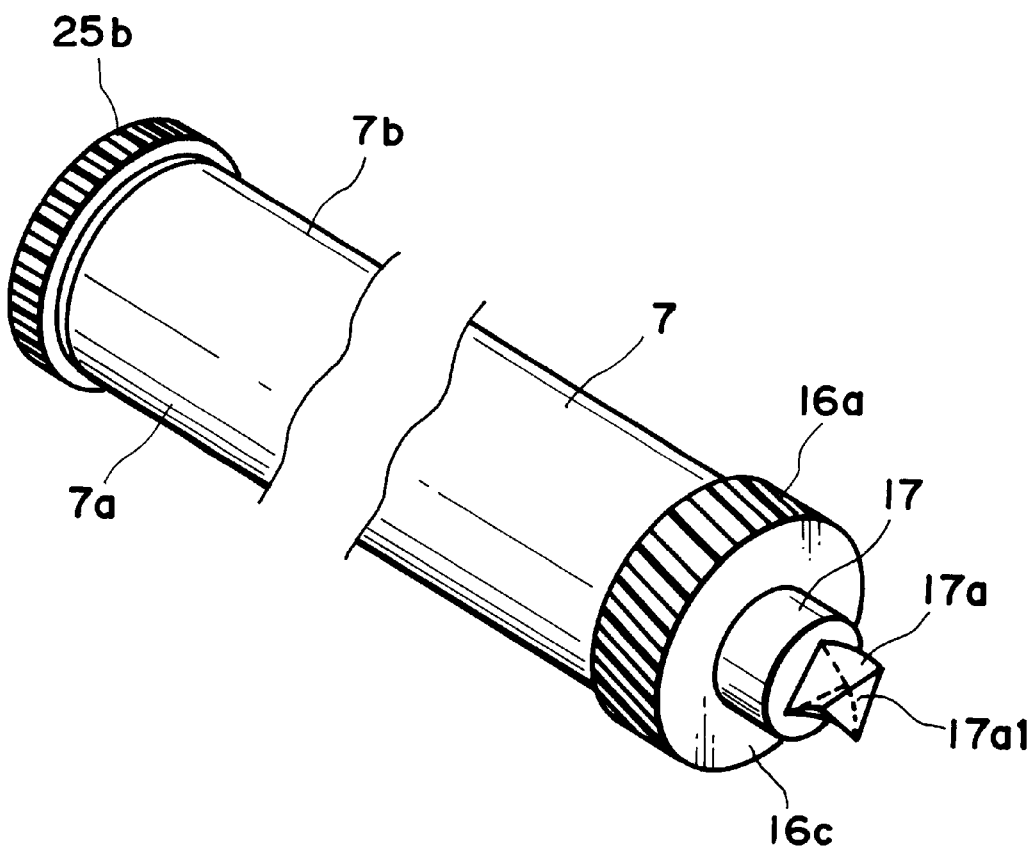
FIG. 8 is a perspective view of a photosensitive drum according to an embodiment of the present invention.
Figure 9:
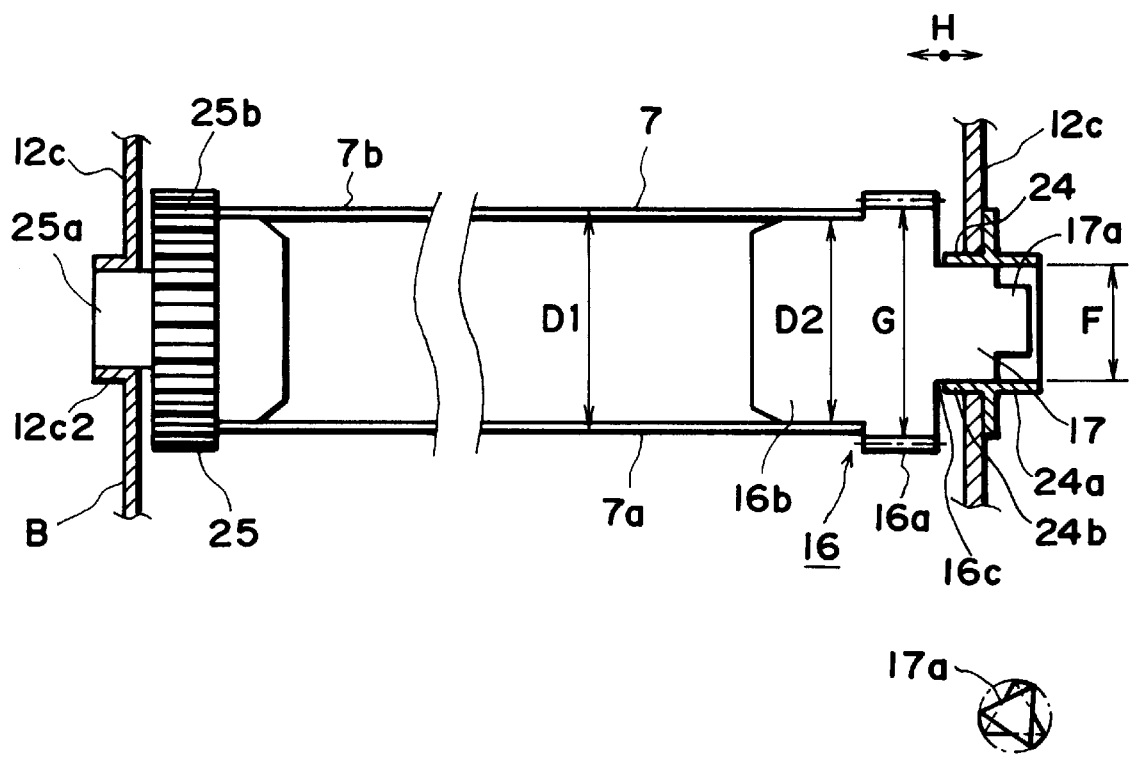
FIG. 9 is a sectional view of a process cartridge side coupling portion according to an embodiment of the present invention.
Figure 10:
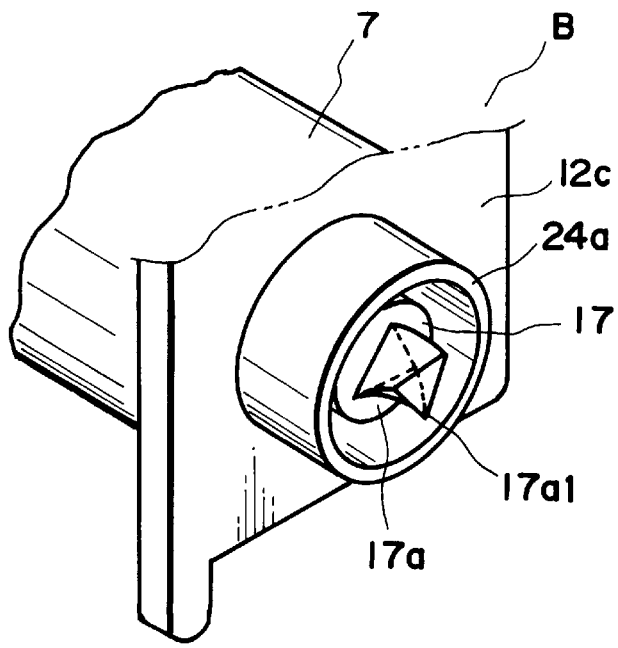
FIG. 10 is a perspective view of a coupling portion of a process cartridge according to a present invention of the present invention.
Figure 11:
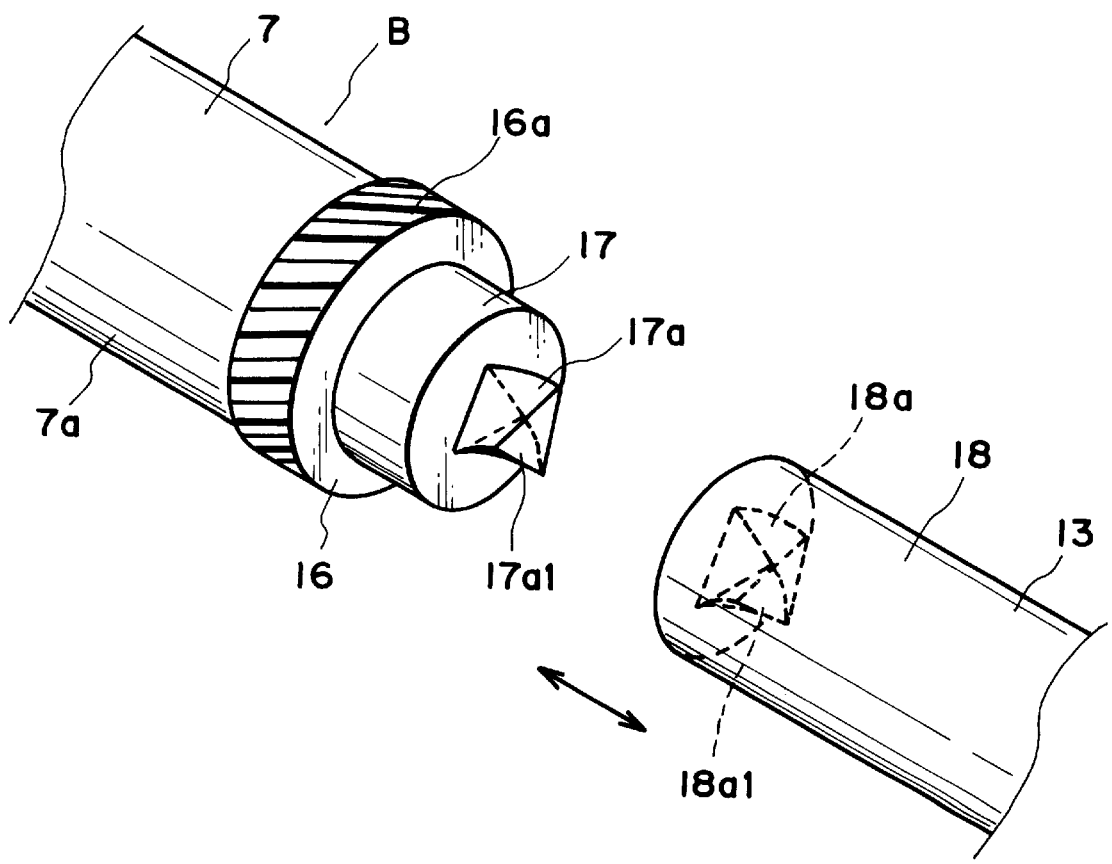
FIG. 11 is a sectional view of a driving system of a main assembly of an electrophotographic image forming apparatus according to an embodiment of the present invention.

FIG. 7 is a perspective view of a drum flange 16 as a driving force transmission part having an integrally formed male shaft 17; FIG. 8 is a partly sectional perspective view of the photosensitive drum 7 having a drum flange 16 mounted thereto; FIG. 9 is a sectional view wherein the photosensitive drum 7 is mounted to the process cartridge B; FIG. 10 is an enlarged perspective view of the male shaft 17 of the process cartridge B of FIG. 9; FIG. 11 shows the relation between the male shaft 17 (provided to the process cartridge B) and the female shaft 18 (provided to the main assembly 13).

As shown in FIG. 8 to FIG. 11, there is provided a cartridge side coupling means at a longitudinal end of the photosensitive drum 7 in the process cartridge B. The coupling means has a male coupling shaft 17 (circular column configuration) mounted to the drum flange 16 fixed an end of the photosensitive drum 7. Here, the end surface of the projection 17a is parallel with the end surface of the projection shaft 17. The male shaft 17 engages a bearing 24 and functions as a drum rotational shaft. In this example, the flange 16, male coupling shaft 17 and the projection 17a are integrally formed. The flange 16 is provided with a helical gear 16a for transmitting the driving force to the developing gear 10d in the process cartridge. Therefore, as shown in FIG. 7, the drum flange 16 is an integrally molded member having the helical gear 16a, the male shaft 17 and the projection 17a, and is a driving force transmission part having the function of transmitting the driving force.

The projection 17a has a twisted polygonal prism configuration, more and particularly, a configuration resulting from twisting a substantially equilateral triangular prism in the rotational direction. The recess 18a is of a polygonal shape twisted in the rotational direction of the shaft and therefore is engageable with or complementary with the projection 17a. The recess 18a has a section of a shape of a substantially equilateral triangle. The recess 18a integrally rotates with the gear 34 of the main assembly 13. In the structure of this example, the process cartridge B is mounted to the main assembly 13, and the projection 17a and the recess 18a of the main assembly 13 are engaged. When the rotation force is transmitted from the recess 18a to the projection 17a, the apexes of the projection 17a of the equilateral triangle regularly contact the inside surfaces of the recess 18a, and therefore, the centers thereof are automatically aligned by the rotation, as will be understood from FIGS. 8, (a) and (b). Further, a force in the direction of pulling deviating the projection 17 with respect to the recess 18, is produced during rotation due to the twisting directions thereof, so that the end surface 17a1 of the projection contacts to the recess 18a1. Since the photosensitive drum 7 is integral with the projection 17a, the axial position and radial position there are correctly determined in the main assembly 13 of the image forming apparatus.

In this example, as seen from the photosensitive drum 7, the direction of twisting of the projection 17a is opposite from the rotation direction of the photosensitive drum 7 away from the base portion of the projection toward the end portion thereof. The direction of twisting of the recess 18a is opposite therefrom away from the inlet portion of the recess 18a toward the inside. The direction of twisting of the helical gear 16a of the drum flange 16, which will be described hereinafter, is opposite from the twisting direction of the projection 17a.

Figure 18:
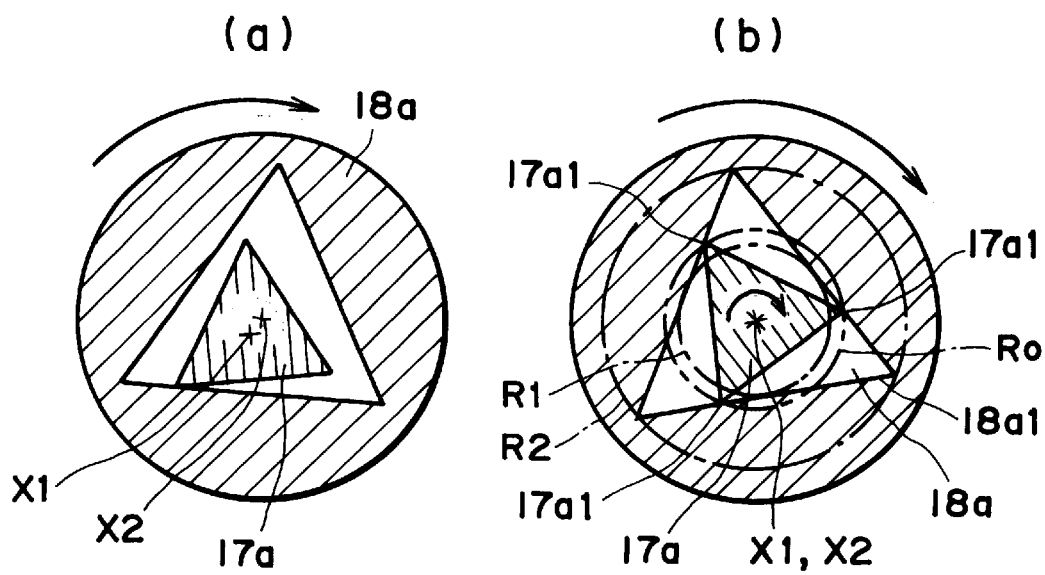
FIGS. 18(*a*) and (*b*) are sectional views of a recess and a coupling projection according to an embodiment of the present invention.

As shown in FIG. 18, the projection 17a and the recess 18a satisfy d1<d0<d2, where d0 is a diameter of a circumscribed circle R0 of the triangular prism of the projection 17a, d1 is a diameter of an inscribed circle R1 of the space in the form of triangle of the recess 18a, and d2 is a diameter of a circumscribed circle R2 of the triangle.

Preferable examples of the numerical ranges of the diameters are as follows:

d0=approximately 3 mm–70 mm d1=approximately 3 mm–70 mm d2=approximately 3 mm–70 mm In these ranges, the sizes are selected so as to satisfy the above-described relations.

In this example, the sizes are as follows:

d0=approximately 16 mm d1=approximately 9.5 mm d2=approximately 17.5 mm

The degree or amount of the twisting of the projection 17a is approximately 1°–15° per 1 mm of the axial length of the projection 17a in the rotational direction. More particularly, in this example, it is twisted at approximately 7.5° per 1 mm of the axial length.

However, the present invention is not limited to these values.

The position of a cross-section of a three dimensional member is determined by three contact points, theoretically. When the configurations of the projections 17a and the recesses 18a are substantially equilaterally triangular, the apexes of the projection 17a contact to the inside surfaces of the equilateral triangle under the same conditions. Therefore, the changes of the contact points and the rotation non-uniformity of the coupling driving due to the load variation during the rotation of the process cartridge B are minimized, thus improving the rotation accuracy of the photosensitive drum 7 (FIG. 18). The male shaft 17 and projection 17a are provided on the drum flange 16 so that when the drum flange 16 is mounted to an end of the photosensitive drum 7, it is aligned with the axis of the photosensitive drum 7. Designated by 16b is an engaging portion which is engaged with an inside surface of the drum cylinder 7a when the drum flange 16 mounted to the photosensitive drum 7. The drum flange 16 is mounted to the photosensitive drum 7 by cramping, bonding or the like. The outer surface of the drum cylinder 7a is coated with a photosensitive material 7b (FIGS. 8 and 9 reference).

A drum flange 25 is fixed to the other end side of the photosensitive drum 7. The drum flange 25 has a drum shaft 25a and spur gear 25b integrally formed therewith.

When the process cartridge B is mounted to the main assembly 13 of the apparatus, the drum shaft 25a (bearing 12c2) is engaged with an U groove 15b (FIG. 5) of the main assembly 13 of the apparatus so as to be correctly positioned, and the spur gear 25b integrally molded with the flange 25 is meshed with a gear (shown) for transmitting the driving force to the transfer roller 4.

Examples of the material of the drum flange 16 include polyacetal (polyacetal), polycarbonate (polycarbonate) and polyamide (polyamide), polybutylene terephthalate, or another resin material. Other materials are usable.

Around the projection 17a of the male coupling shaft 17 of the process cartridge B, a circular projection 24a coaxial with the male shaft 17 is provided on the cleaning frame 12c (FIGS. 3 and 9). The projection 24a functions to protect the coupling projection 17a when, for example, the process cartridge B is mounted or demounted relative to the main assembly, so that the coupling projection 17a is prevented from being damaged or deformed by external force or the like. Thus, the vibration or wobbles during the coupling driving operation due to the damage of the projection 17a, can be avoided.

The projection 24a also can function as a guiding member for the mounting and demounting of the process cartridge B relative to the main assembly 13 of the image forming apparatus. More particularly, when the process cartridge B is mounted to the main assembly A, the projection 24a contacts the main assembly side guide portion 15c and functions to guide the process cartridge B to the mounting position of the apparatus, thus facilitating the mounting-and-demounting of the process cartridge B relative to the main assembly 13. When the process cartridge B is mounted to the mounting position, the projection 24a is supported by the recess 15d provided on the guide portion 15c. When the male coupling shaft 17 and female shaft 18 are aligned by the driving for the image formation, the projection 24a is raised slightly from the U groove 15d (approx. 0.3 mm–1.0 mm), and the gap between the projection 24a and the main assembly guide portion 15a(recess 15d) is smaller than the gap between the coupling projection 17a and the recess 18a in the radial direction. Therefore, the engagement between the coupling projection 17a and the recess 18a is permitted while the process cartridge B is mounted to the main assembly 13. A recess 18a is provided opposed to the U groove 15d. The configuration of the projection 24a is not limited to the circular shape as in this example, but may be any, for example, an arcuate configuration, if it is guided by the guide portion 15c, and is supported by the U groove 15d. In this example, the bearing 24 for supporting rotatably the shaft portion 17 and the circular projection 24a is integrally molded, and is fixed to the cleaning frame 12c by screws (FIG. 9), but the bearing 24 and the projection 24a may be separate members.

In this example, the drum shaft 25a is engaged with the bearing portion 12c2 provided in the cleaning frame 12c (FIG. 49), and the male shaft 17 is engaged to the inside surface of the bearing 24 provided in the cleaning frame 12c, and with in state, the photosensitive drum 7 is mounted to the cleaning frame 12c of the process cartridge B. Therefore, the photosensitive drum 7 is rotated about the shaft 17 and 25a. In this example, the photosensitive drum 7 is mounted to the cleaning frame 12c in the manner that the movement thereof in the axial direction is possible. This is done in consideration of the mounting tolerance. This structure is not inevitable, and the photosensitive drum 7 may be non-movable in the slide direction.

Among the photosensitive drum 7, the flange 16 and the male coupling shaft 17, there is a relationship as shown in FIG. 9. More particularly, the outer diameter of the photosensitive drum 7 (outer diameter of the cylinder 7a)=D1, the helical gear dedendum circle diameter=G, the diameter of the photosensitive drum bearing (outer diameter of the shaft portion 17, the inner diameter of the bearing 24)=F, the diameter=C of the circumscribed circle of the coupling projection, and the engaging portion diameter (drum inner diameter)=D2 of the drum flange 16 relative to the photosensitive drum 7, satisfy $D1 > F \geq C$ and $G \geq D2$.

The condition $D1 > F$ is effective to reduce the torque required by the sliding load at the bearing. The condition $F \geq C$ is effective to simplify the mold structure when the flange portion is molded since the undercut portion is not required which otherwise is required in the mold division of the mold in the direction of the arrow H in the figure.

Furthermore, because $G > D2$ is satisfied, the mold configuration of the gear portion is on the left side mold in FIG. 6, and therefore, the right side mold structure, which is complicated due to the provision of the coupling configuration, is simplified, and therefore, the durability of the mold is improved.

The dimensional relations apply in the case that the relation between the male shaft 17 and the female shaft 18 are reversed, that is, in the case that the photosensitive drum is provided with the recess 18a while the main assembly side of the apparatus is provided with the projection 17a (the diameter of the circumscribed circle of the polygonal of the recess 18a is C). The same advantages are provided in such a case, too.

Examples of the numerical ranges of them are as follows:

D1=approximately 10 mm–60 mm

G=approximately 10 mm–70 mm

F=approximately 5 mm–70 mm

C=approximately 3 mm–70 mm

D2=approximately 9 mm–59 mm.

The sizes may be selected within these ranges so as to satisfy the above-described relations.

In this example, sizes are as follows:

D1=approximately 30 mm

G=approximately 31 mm

F=approximately 16 mm

C=approximately 14 mm.

However, the present invention is not limited to these sizes.

Figure 12:
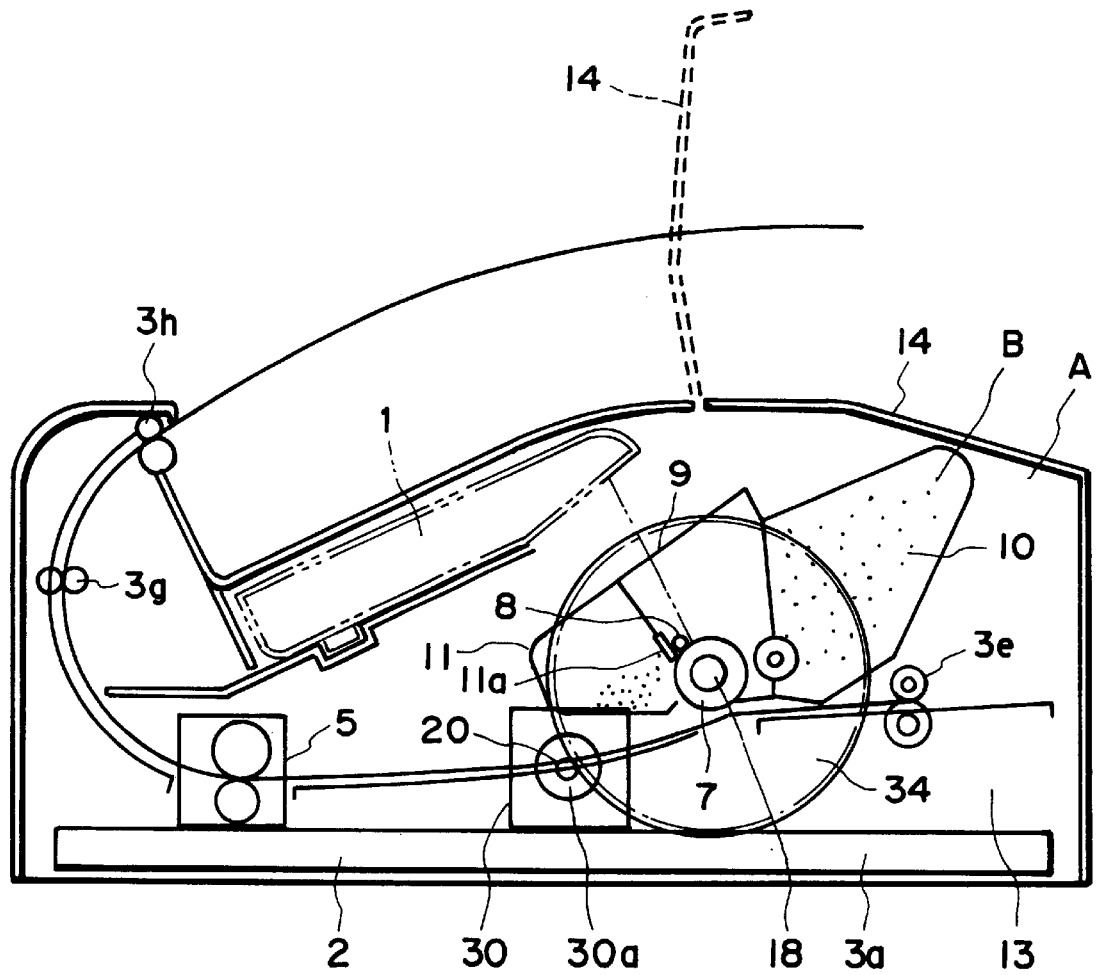
FIG. 12 is a sectional view of a driving system of a main assembly of an electrophotographic image forming apparatus according to an embodiment of the present invention.
Figure 13:
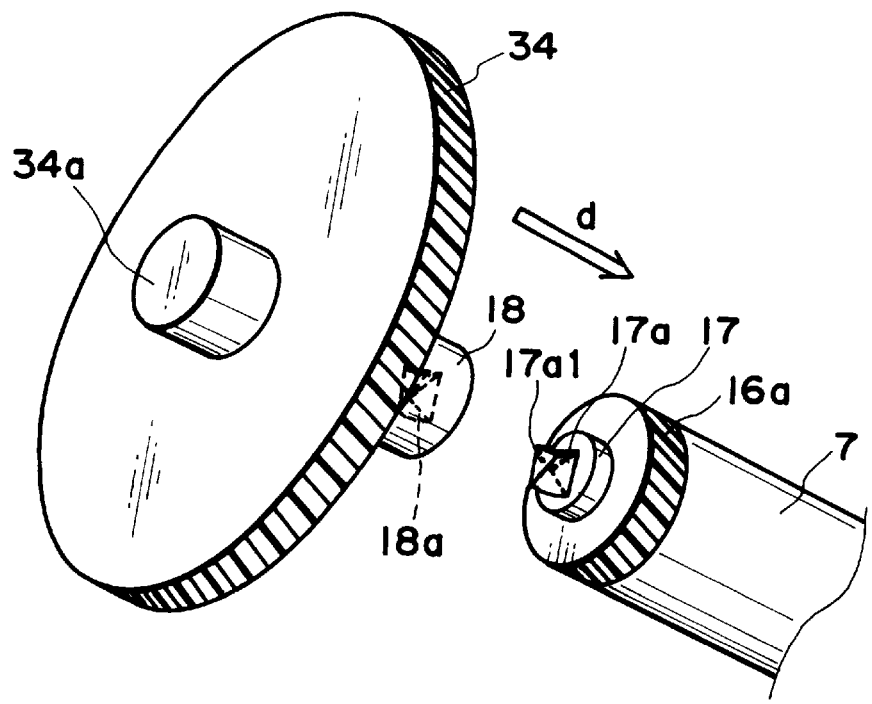
FIG. 13 is a perspective view of a coupling of a main assembly of the device and a coupling of the process cartridge, according to an embodiment of the present invention.
Figure 14:
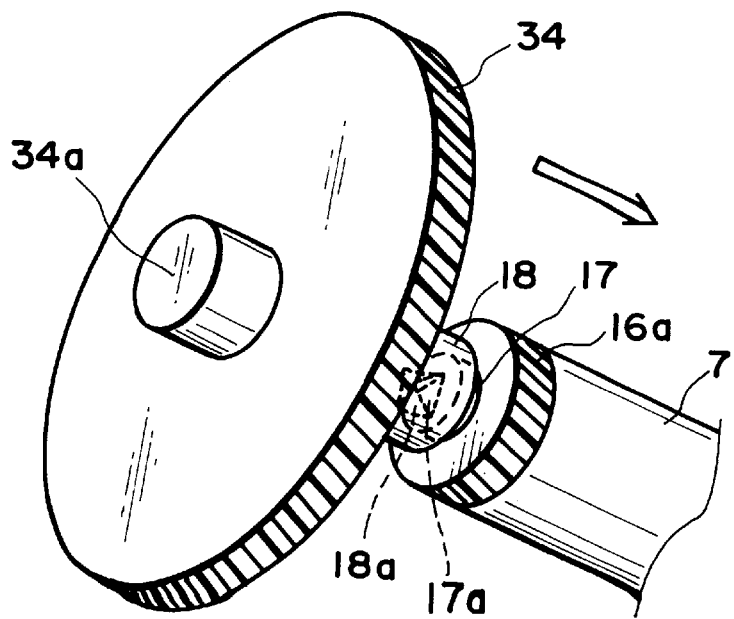
FIG. 14 is a perspective view of a coupling of a main assembly of a device and a coupling of a process cartridge according to an embodiment of the present invention.

On the other hand, the main assembly 13 of the image forming apparatus is provided with main assembly coupling means. The main assembly coupling means includes a female coupling shaft 18(circular column configuration) at a position in alignment with the photosensitive drum rotation axis when the process cartridge B is inserted. The female coupling shaft 18 is a driving shaft integral with the large diameter gear 34 for transmitting the driving force from the motor 30 to the photosensitive drum 7, as shown in FIG. 12. The female shaft 18 is projected from a lateral edge of the gear 34 at a rotation center of the gear 34 (FIGS. 13, 14). In this example, the large diameter gear 34 and the female coupling shaft 18 are integrally molded.

The gear 34 in the main assembly side is a helical gear. The tooth thereof has such an inclination angle that a thrust is produced in the direction of moving the female shaft 18 toward the male shaft 17 when the driving force is transmitted thereto from the helical gear 20 fixed to the shaft 30a of the motor 30. Therefore, when the motor 30 is driven upon image formation, the thrust is effective to move the female shaft 18 to the male shaft 17 to establish firm coupling between the recess 18a and the projection 17a. The recess 18a is provided at the rotation center of the female shaft 18 at an end of the female shaft 18.

In the embodiment, the driving force is transmitted directly from the gear 20 fixed to the motor shaft 30a to the gear 34, a gear train may be used for deceleration and driving transmission, or the use may be made of a belt and pulley, a pair of friction rollers or a combination of a timing belt and a pulley.

Figure 15:
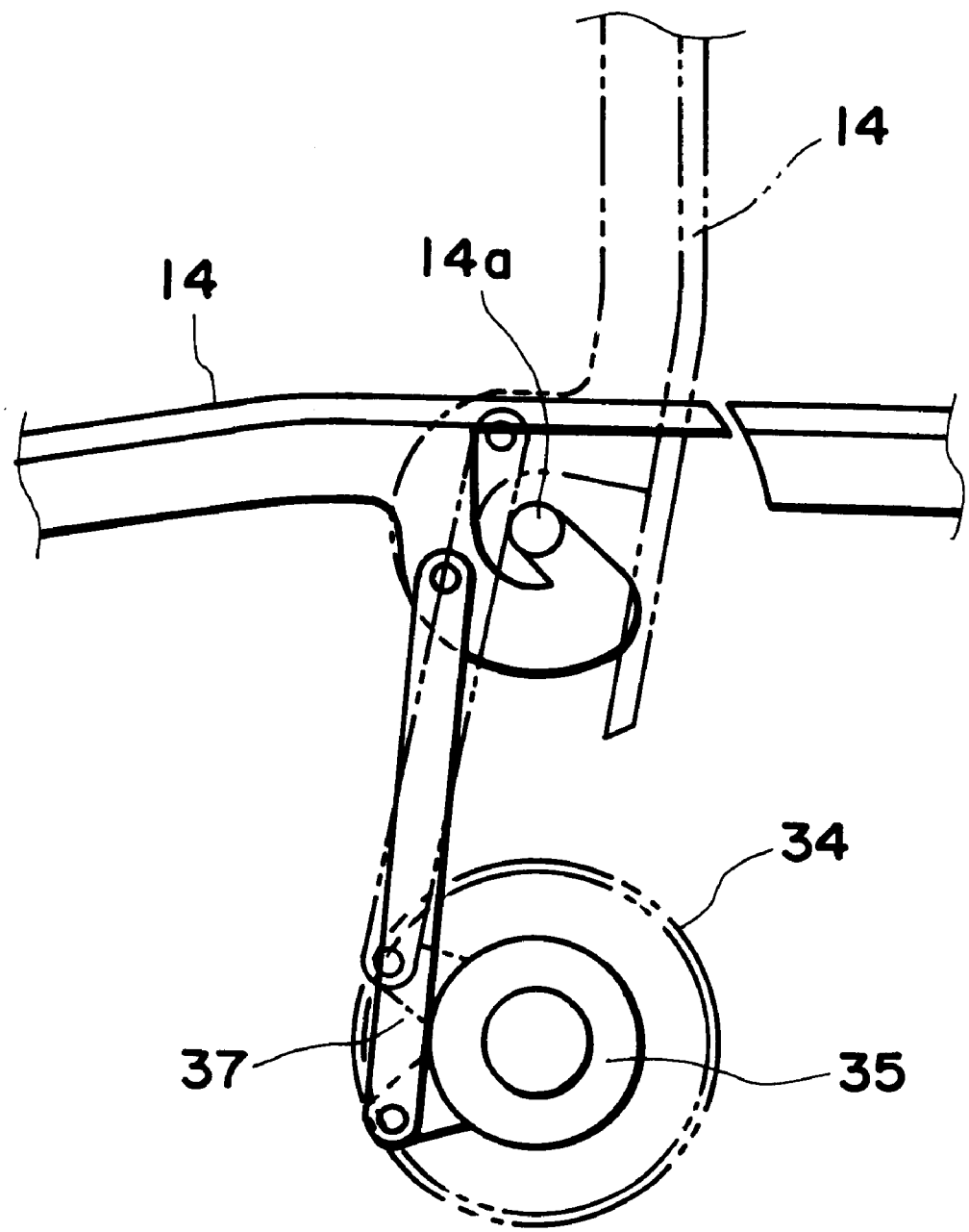
FIG. 15 is a sectional view of a structure of a coupling portion and a cover of the main assembly of the device according to an embodiment of the present invention.
Figure 16:
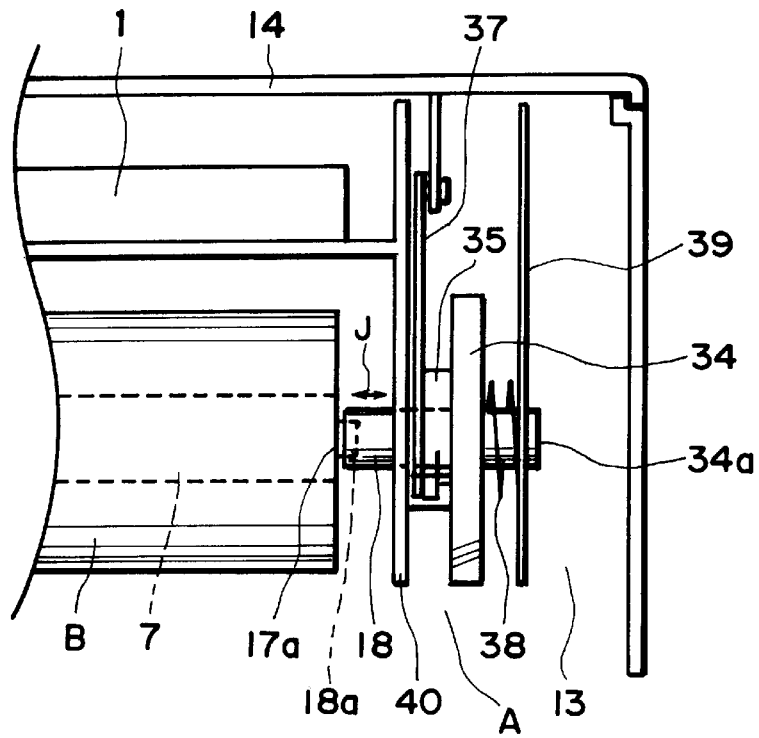
FIG. 16 is a side view of a structure of a female coupling shaft according to an embodiment of the present invention.
Figure 17:
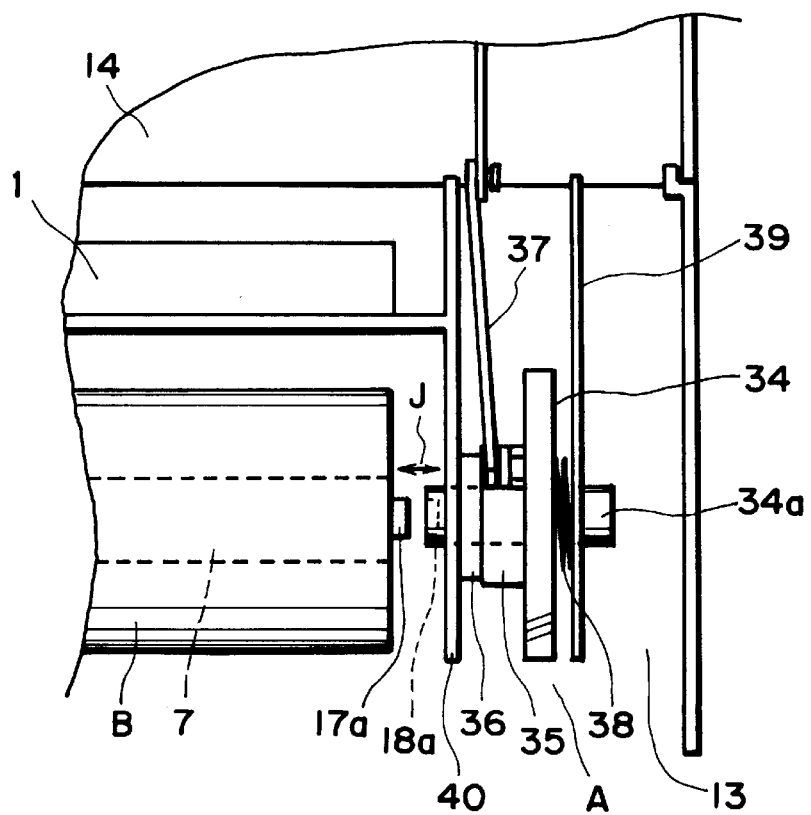
FIG. 17 is a side view of a structure of a female coupling shaft upon process cartridge mounting-and-demounting relative to the main assembly according to an embodiment of the present invention.

Referring to FIG. 15 to FIG. 17, a description will be provided as to the structure for engaging the recess 18a and projection 17a in interrelation with the closing operation of the openable cover 14.

FIG. 15 is a view as seen in a direction of the axis of the photosensitive drum 7, wherein an outer cam 35 and an inner cam 36(FIG. 17 reference) are disposed between the gear 34 and the photosensitive drum 7(unshown), and the cover 14 of the image forming apparatus and the outer cam 35 are connected by a rod 37, thus constituting a moving means. Designated by 40 is a side plate provided in the main assembly 13. Referring to FIGS. 16 and 17, designated by 34a is a shaft supporting portion for supporting the gear 34 on the side plate 39.

FIG. 16 is a view as seen from the right side. When the cover 14 is closed, the rod 37 and the outer cam 35, and so on, take the position shown in this figure, and they are coupled by the coupling projection 17a and the recess 18a to permit driving force transmission from the gear 34 to the photosensitive drum 7. When the cover 14 is opened, the cam 35 is pulled through the rod 37, as shown in FIG. 17, and therefore, the cam 35 is rotated to be contacted to the inner cam 36, thus moving the gear 34 away from the photosensitive drum 7. At this time, the gear 34 and the female coupling shaft 18 are pushed by the outer cam 35 to push the spring 38 mounted between itself and the fixing plate 39 and moves in the same direction, so that the recess 18a becomes spaced from the projection 17a to release the coupling, by which the cartridge B demounting is enabled. When the cover 14 is closed, the cam 35 rotates in the opposite direction and is pushed by the spring 38 so that the gear 34 is reset to the position shown in FIG. 16 to enable the driving transmission. With this structure, the mounting-and-demounting of the cartridge B and the drive transmission are disabled and enabled in response to the opening and closing of the cover 14.

In this example, the cover 14 is opened and closed when the process cartridge B is mounted to or demounted from the main assembly of the apparatus. In interrelation with the opening and closing of the cover 14, the recess 18a moves in a horizontal direction (arrow j direction). When the process cartridge B is mounted or demounted relative to the main assembly, the coupling (between 17a and 18a) between process cartridge B and the main assembly 13 of the apparatus is assuredly disengaged. Therefore, the mounting-and-demounting of the process cartridge B relative to the main assembly 13 can be smoothly carried out. In this example, the recess 18a is urged toward the process cartridge B by the spring 38. Therefore, even if the projection 17a and the recess 18a are not aligned, and therefore abutment occurs therebetween, and they are not engaged, they are engaged instantaneously upon the rotation of the recess 18a.

A description will be provided as to the configurations of the projection 17a and the recess 18a which are engaging portion of the coupling means.

The female coupling shaft 18 provided in the main assembly 13 is movable toward the rotational shaft, as described hereinbefore, but is not movable in the radial direction. The process cartridge B is mounted in the main assembly 13 of the apparatus such that it is movable in the longitudinal direction and radial direction of the photosensitive drum 7.

More particularly, when the process cartridge B is mounted in the main assembly 13 of the device, a portion of the drum shaft 25a (bearing 12c2) (FIGS. 4 and 9) formed on the flange 25 mounted adjacent the other longitudinal end of the photosensitive drum 7 is received by the U groove 15b(FIG. 5) of the main assembly 13 and is engaged therewith without a gap, so that it is correctly positioned, and the spur gear 25b integrally molded with the flange 25 is meshed with a gear (not shown) for transmitting the driving force to the transfer roller 4. On the other hand, at the longitudinal end of the photosensitive drum 7 (driving side), the projection 24a of the cleaning frame 12c is supported by the recess 15d of the main assembly 13. By closing the cover 14, the recess 18a is moved in a horizontal direction and is received by the projection 17a (FIG. 8 (a)).

The positioning and driving transmission at the driving side (coupling side) are as follows.

When the main assembly driving motor 30 is rotated, the female coupling shaft 18 is moved toward the male coupling shaft 17 (arrow d in FIG. 13), and they are engaged when the phases of the projection 17a and the recess 18a are matched (in this example, since the projection 17a and recess 18a have substantially equilateral triangular configurations, the phases thereof match every 120°). Then the rotation force is transmitted from the main assembly 13 of the apparatus to the process cartridge B (from the state of FIG. 17 to the state of FIG. 16).

Since the sizes of the equilateral triangles are different, more particularly, the size of the triangle of the recess 18a is larger than that of the projection 17a (as shown in FIG. 8 (a)), the projection 17a is smoothly engaged into the recess 18a with the gap therebetween. The accuracy of the positioning between the male coupling shaft 17 and female coupling shaft 18 may be rough at the time of engaging action.

In this example, the projection length of the circular projection 24a is larger than that of the projection 17a (FIG. 9). Therefore, when the projection 17a and the recess 18a are engaged, the inside surface of the circular projection 24a is engaged with the outer peripheral surface of the female coupling shaft 18 to guide the engagement therebetween.

When the female coupling shaft 18 is rotated with the projection 17a engaged with the recess 18a for image formation, the inside surfaces 18a1 of the recess 18a are engaged to the apex lines 17a1 of the equilateral triangular prism of the projection 17a (as shown in FIG. 8) to permit the transmission of the driving force. At this time, the male shaft 17 instantaneously moves so that the inside surfaces 18a1 of the recess 18a contact the edge lines 17a1 of the projection 17a at regular positions (equidistantly) (from the state of FIG. 8 (a) to the state of FIG. 8 (b)). Since the projection 17a and the recess 18a are both substantially equilateral triangles, the male shaft 17 and the female shaft 18 are brought into the coaxial state with each other with uniform contact forces. Immediately after the projection 17a is brought into engagement with the recess 18a, the rotation center of the projection 17a is not aligned with the rotation center X2 of the recess 18a (FIG. 8 (a)). However, when the recess 18a starts to rotate, and it is contacts the edge line 17a1 of the projection 17a at 3 points (lines), the rotation centers X1 and X2 are substantially aligned.

Thus, the coupling shaft 17 and 18 are automatically axis aligned by the rotation of the motor 30 (self-alignment). Furthermore, by the driving force transmission to the photosensitive drum 7, the process cartridge B is rotated, by which the abutment portion 12c1 provided on the top surface of the cleaning frame 12c of the process cartridge B (FIGS. 3 and 4) abuts the abutment portion 13a (FIG. 1) fixed to the main assembly 13 of the image forming apparatus, so that the process cartridge B is precisely positioned to the main assembly A of the image forming apparatus.

When the process cartridge is not driven (non-image formation), a gap is provided between the projection 17a and recess 18a in the rotation radius direction (radial direction), the engagement between the couplings, and the mounting and demounting of the process cartridge relative to the main assembly are made easier. Additionally, the contact force at the coupling engagement portion is stabilized, so that wobble and vibration at this position can be suppressed.

In this example, the coupling projection and recess have the substantially equilateral triangular configurations, but the similar advantage can be provided if the configuration is equilateral polygonal. The use of an equilateral polygonal configuration is preferable since the positioning is correct, but any polygonal configuration is usable if the engagement is possible and pulling engagement is possible.

When a comparison is made between the coupling projection and recess, the projection is easily damaged, and the strength thereof is smaller than the recess. In this example, the coupling projection is provided in the process cartridge B which is exchangeable, and the coupling recess is provided in the main assembly 13 which is required to have a higher strength.

The process cartridge B of the embodiment is summarized as follows. The process cartridge B of this example is detachably mountable relative to a main assembly of an electrophotographic image forming apparatus A comprising a motor 30, a main assembly gear 34 for receiving the driving force from the motor, and a twisted polygonal hole 18a integrally rotatable with the main assembly gear, the hole being formed at the center of the main assembly gear, and the electrophotographic image forming apparatus A being capable of forming an image on the recording medium 2. The process cartridge comprises the electrophotographic photosensitive drum 7, the process means actable on the electrophotographic photosensitive drum (charging roller 8, developing roller 10, cleaning blade 11a), and a twisted polygonal prism projection (projection 17a) engageable with the twisted polygonal hole of the main assembly, the projection being provided at the end of the electrophotographic photosensitive drum. The process cartridge B is mounted to the main assembly 13 of the main assembly, and the polygonal prism projection 17a is engaged with the recess of the main assembly, and when the gear 34 is rotated, the rotational driving force is transmitted to the photosensitive drum.

The projection 17a is projected from the end of the shaft portion 17 projected outwardly in the longitudinal direction of the drum from the rotation center position of the drum 7. The shaft portion functions to rotatably support the drum 7 on the cartridge frame 12c.

The shaft portion 17 is provided at the central portion of the helical gear 16a, and at the opposite end from the helical gear 16a side, an engaging portion 16b for engagement with the inside surface of the electrophotographic photosensitive drum 7 is provided. The projection 17a, the shaft portion 17, the helical gear 16a, and the engaging portion 16b are integrally molded of a resin material material. The helical gear functions to transmit the rotation force to the developing roller 10a as the process means.

Furthermore, there is provided a circular outer wall 24a enclosing the polygonal prism projection 17a, or an arcuate configuration outer wall along a part of the polygonal prism projection. The outer wall 24a functions as a guide when the engagement between the hole 18a and the projection 17a by relative movement therebetween.

The outer diameter D1 of the electrophotographic photosensitive drum 7, the outer diameter F of the shaft portion 17, and the diameter C of the circumscribed circle of the polygonal prism projection 17a, satisfy $D1 > F \geq C$.

The outer diameter F of the shaft portion 17, the diameter C of the circumscribed circle of the polygonal prism projection 17a, the dedendum diameter G of the gear 16a of the electrophotographic photosensitive drum 7, and the inner diameter D2 of the electrophotographic photosensitive drum 7, satisfy $G > D2$ and $G > F \geq C$.

The outer diameter D1 of the electrophotographic photosensitive drum 7, and the dedendum circle diameter L of the main assembly gear 34, L is preferably not less than approx. 1.0 times D1 and not more than 5.0 times D1. The relation is properly selected by one skilled in the art in consideration of the space of the main assembly of the device and the desired image quality. The dimensions are not limiting. In this example, it is approximately 3 times.

The module of the main assembly gear 34 is approximately 0.4–0.7. The dedendum diameter L of the main assembly gear 34 of the device is approximately 30 mm–150 mm, and the number of teeth of the main assembly gear 34 is approximately 40 teeth to 400 teeth. They are properly selected by one skilled in the art in consideration of the space in the main assembly and desired image quality. The figures are not limiting. In this example, the module of the gear 34 is approximately 0.5, and L is approximately 100 mm, and the number of the teeth of the gear 34 is 200 teeth.

The positioning of the process cartridge B relative to the main assembly 13 during the image formation (driving transmission) is summarized as follows.

First, the process cartridge B is positioned by the bearing 12 being snugly fitted in the U groove 15*d* during the non-image formation. On the other hand, the projection 24*a* is simply supported by a receptor portion 15*c*. During image formation, the process cartridge B is positioned by the projection 17*a* being attracted by the recess 18*a* of the main assembly 13 and being engaged with the projection 17*a*. Namely, during image formation, the process cartridge B is positioned by the U groove 15*b* at one longitudinal end, and by the recess 18*a* at the other end. In this example, the photosensitive drum 7 is movable in the longitudinal direction (approximately 0.1 mm–1.0 mm). When the projection 17*a* is attracted to the recess 18*a*, the end portion 16*c* of the drum flange 16 (FIGS. 7 and 8 and FIG. 9) is brought into contact with the end portion 24*b* of the bearing 24. The process cartridge B, which is mounted movably relative to the main assembly side plate or mounting guides 15*a* and 15*c* with play of approximately 0.1–3 mm) in consideration of assembly tolerance, is pulled toward the photosensitive drum 7 in the longitudinal direction and in the radial direction, thus moving in an inclined upward direction. In the case the end portion 16*c* is in contact with the end portion 24*b* at the beginning, or when the photosensitive drum 7 does not have a play in the longitudinal direction, the process cartridge B is pulled to the photosensitive drum 7 immediately in its longitudinal direction and in the radial direction, thus moving in an upward inclined direction.

During the image formation operation, the process cartridge B receives the rotation force in the same direction as the rotation direction of the photosensitive drum 7. By this rotation force, the contact portion 12*c*1 contacts the fixed portion 13*a*.

Accordingly, the process cartridge B is correctly positioned relative to the main assembly 13 of the apparatus in both the longitudinal direction and the radial direction during the image formation operation.

Figure 21:
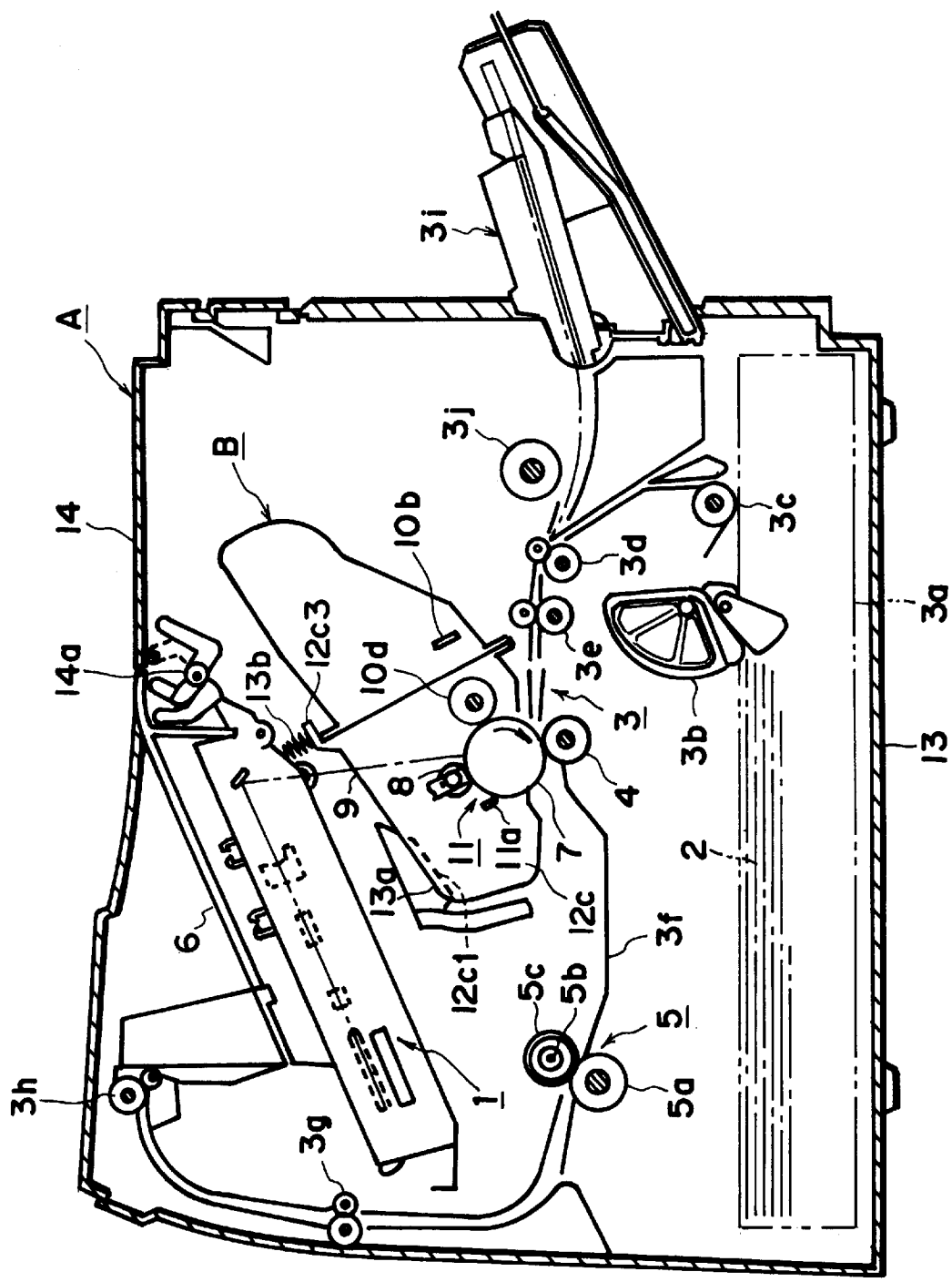
FIG. 21 is a sectional view of an electrophotographic image forming apparatus according to an embodiment of the present invention.

When the process cartridge B is pushed by an elastic member as in FIG. 21 example, the process cartridge B may not move in the longitudinal direction of the drum 7, depending on the strength of the elastic force provided by the elastic member. Even in that case, when the drive transmission starts, the process cartridge B moves in the radial direction (substantially upward) so that it is correctly positioned relative to the main assembly. In this case, even if the drum 7 does not involve play in the longitudinal direction, the process cartridge B is correctly positioned relative to the main assembly.

Referring back to FIG. 18, it will be understood that the coupling mechanism is summarized as follows. The driving rotatable member 18*a* for receiving a driving force from the motor is provided with a twisted recess or projection having a non-circular cross-section and is substantially coaxial with a rotation axis X2 of the drive rotatable member 18*a*. The member to be driven or the image bearing member is provided with a twisted projection or recess 17*a* provided at a longitudinal end of the image bearing member, having a non-circular cross-section and being substantially coaxial with a rotation axis of the image bearing member, wherein the projection or recess of the image bearing member 17*a* has such a dimension and configuration that it can take a first relative rotational position (FIG. 18, (*a*), for example) with respect to the recess or projection of the driving rotatable member 18*a* in which relative rotational movement therebetween is permitted, and a second relative rotational position (FIG. 18, (*b*), for example) with respect to the recess or projection of the driving rotatable member 18*a* in which relative rotational movement is prevented in one rotational direction (indicated by arrows in FIG. 18, (*b*)), while the rotation axis X2 of the driving rotatable member 18*a* and the rotation axis X1 of the image bearing member are substantially aligned with each other.

It is preferable that the recess or projection of the driving rotatable member and the projection or recess of the image bearing member are contacted substantially at three twisted points (lines). It is further preferable that the three points constitute a substantially equilateral triangle.

Embodiment 2

Figure 19:
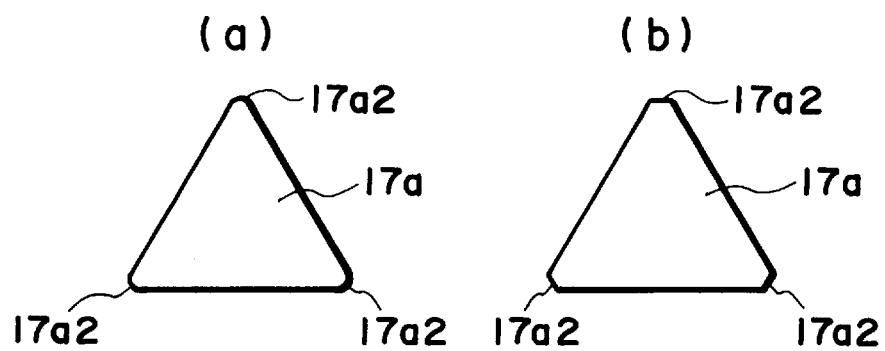
FIGS. 19(a) and (b) are views of a coupling projection according to one embodiment of the present invention.

Referring to FIG. 19, a description will be provided as to embodiment 2 of the projection 17*a* of the male coupling shaft 17. The fundamental structures of the process cartridge and the image forming apparatus are the same as in embodiment 1, and therefore, the same reference numerals as in embodiment 1 are assigned to the elements having the corresponding functions, and detailed descriptions thereof are omitted for simplicity.

The coupling projection 17*a* of FIG. 19 is different from that in embodiment 1 in that the apexes 17*a*2 of the substantially equilateral polygonal prism shape of the projection (it is substantially equilateral triangle shape in FIG. 19) are beveled. The beveling includes rounding as shown in FIG. 19, (*a*) and straight cutting as shown in FIG. 19, (*b*).

With this structure, the collapse of the apexes of the projection 17*a* during handling of the process cartridge B can be avoided. During the driving, the deformation and deflection of the apexes due to insufficient strength can be avoided. Thus, the decrease of the alignment accuracy between the male shaft 17 and the female shaft 18 can be prevented, and the wobble and vibration at the coupling portion can be avoided.

In FIG. 19, (*a*), as will be understood when this configuration is introduced in the projection 17*a* of FIG. 18, (*b*), the portions contacting the inner surface of the recess are not the outermost points of the configuration of FIG. 19, (*a*), but are portions slightly deviated therefrom (at each apex portion). From the standpoint of axis alignment, it is preferable that such deviated three contact points constitute a substantially equilateral triangle.

Similarly, in FIG. 19, (*b*), it is preferable that the three points constitute a substantially equilateral triangle.

For the same reason, in a polygonal projection (polygonal recess) examples, it is preferable that the projection and recess are contacted at three points which constitute a substantially equilateral triangle, from the standpoint of axis alignment.

In the case of FIG. 19, (*a*), each contact point (actually a twisted line) in the cross-section may have a certain-width. In such a case, the centers or one side ends of the widths are deemed as the points to constitute the triangle.

Embodiment 3

Figure 20:
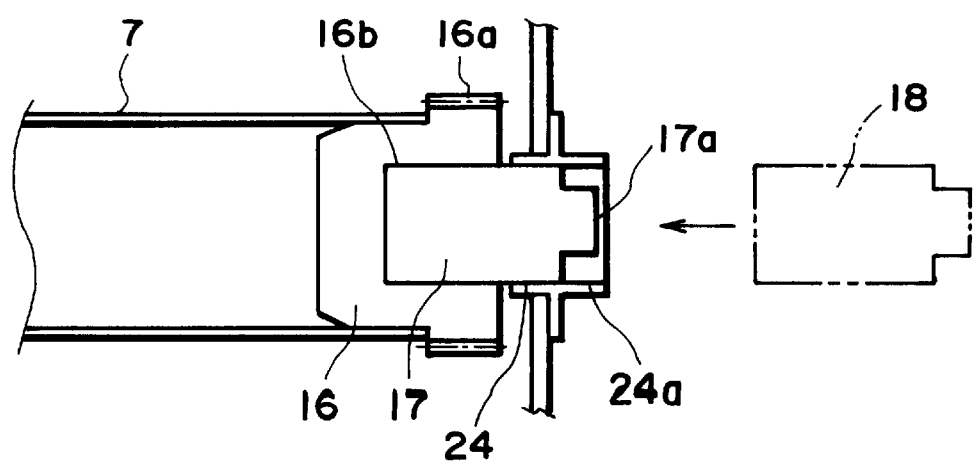
FIG. 20 is a sectional view of a process cartridge side coupling portion according to an embodiment of the present invention.

Referring to FIG. 20, a description will be provided as to embodiment 3 of the projection of the male coupling shaft 17. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

In embodiment 1, the flange 16 of the photosensitive drum 7 and the male coupling shaft 17 are integral, but they may be separate members, which are incorporated in the process cartridge B, respectively.

When the male coupling shaft 17 and the flange 16 are separate members, as in this example, the male coupling shaft 17 can be mounted into the engaging portion 16b of the flange 16 by press-fitting or the like after the photosensitive drum 7 with the flange 16 is incorporated in the frame 12c, so that the photosensitive drum 7 may not be assembled into the frame 12c in an inclined direction.

Embodiment 4

Referring to FIG. 21, a description will be provided as to embodiment 4 having a different positioning structure of the process cartridge to the main assembly of the image forming apparatus, using the coupling structure of the present invention. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

As shown in FIG. 21, the main assembly 13 of the image forming apparatus is provided with an elastic member 13b for urging the process cartridge B in the rotation direction of the photosensitive drum 7. The elastic member 13b contacts the contact portion 12c3 of the cleaning frame 12c of the process cartridge B while the process cartridge B is in the main assembly in place, and it applies the rotation force in the same direction as the rotation direction of the photosensitive drum 7 to the process cartridge B. The process cartridge B receiving the rotation force tends to rotate in the rotation direction of the photosensitive drum 7 (clockwise direction in FIG. 21), but is stopped by the abutment between the abutment portion 12c1 of the frame 12c and the abutment portion 13a of the main assembly. This is effective to prevent vibration, in the rotation direction, of the process cartridge B urged in the rotation direction of the photosensitive drum 7 by the coupling driving force, due to the internal load variation or the like. The contact portion 12c3 is provided at each of two positions, namely, adjacent one end side and other end side in the longitudinal direction of the photosensitive drum 7 on the top surface of the cleaning frame 12c (FIGS. 3 and 4).

Embodiment 5

Figure 22:
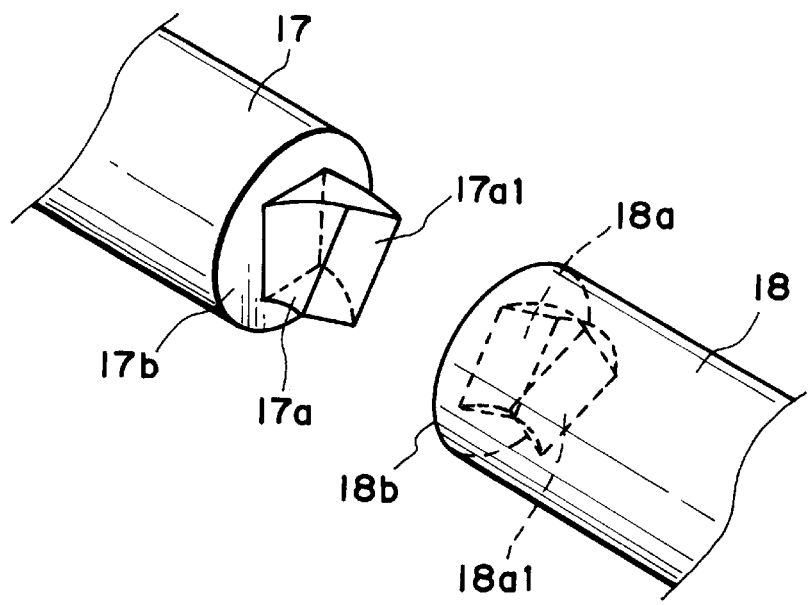
FIG. 22 is a perspective view of a recess and a coupling projection according to an embodiment of the present invention.

Referring to FIG. 22, another embodiment of the coupling structure will be described. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

In this example, as shown in FIG. 22, the projection 17a of the male coupling shaft 17 and the recess 18a of the female shaft 18 has a substantially rectangular configuration section which is twisted in the rotation direction of the shaft. Similarly to embodiment 1, the durable coupling recess 18a is provided in the main assembly 13 of the image forming apparatus. With this structure, when the driving is transmitted while the coupling is in engagement, a force is produced so that the female coupling shaft 18 pulls the male shaft 17 in the axial direction due to the twisting direction thereof, by which the projection end surface 17a1 of the male coupling shaft 17 abuts the recess bottom surface 18a1 (or, the male shaft end surface 17b abuts the end surface 18b of the female shaft).

Since the position of the process cartridge B is constant in the direction of the coupling shaft in the main assembly A of the image forming apparatus during the driving operation, the vibration of the process cartridge can be suppressed.

In this example, the cross-sectional configurations of the projection 17a of the coupling shaft and the recess 18a have a substantially rectangular configuration, but another polygonal prism shape is usable if the engagement is established when the coupling recess is rotated.

When the process cartridge B is demounted from the main assembly, the motor 30 may be rotated in the opposite direction, the coupling engagement is automatically released due to the thrust between the gear 33 and the helical gear 34. In this case, there is no need of using the coupling release mechanism as in embodiment 1.

Embodiment 6

Figure 23:
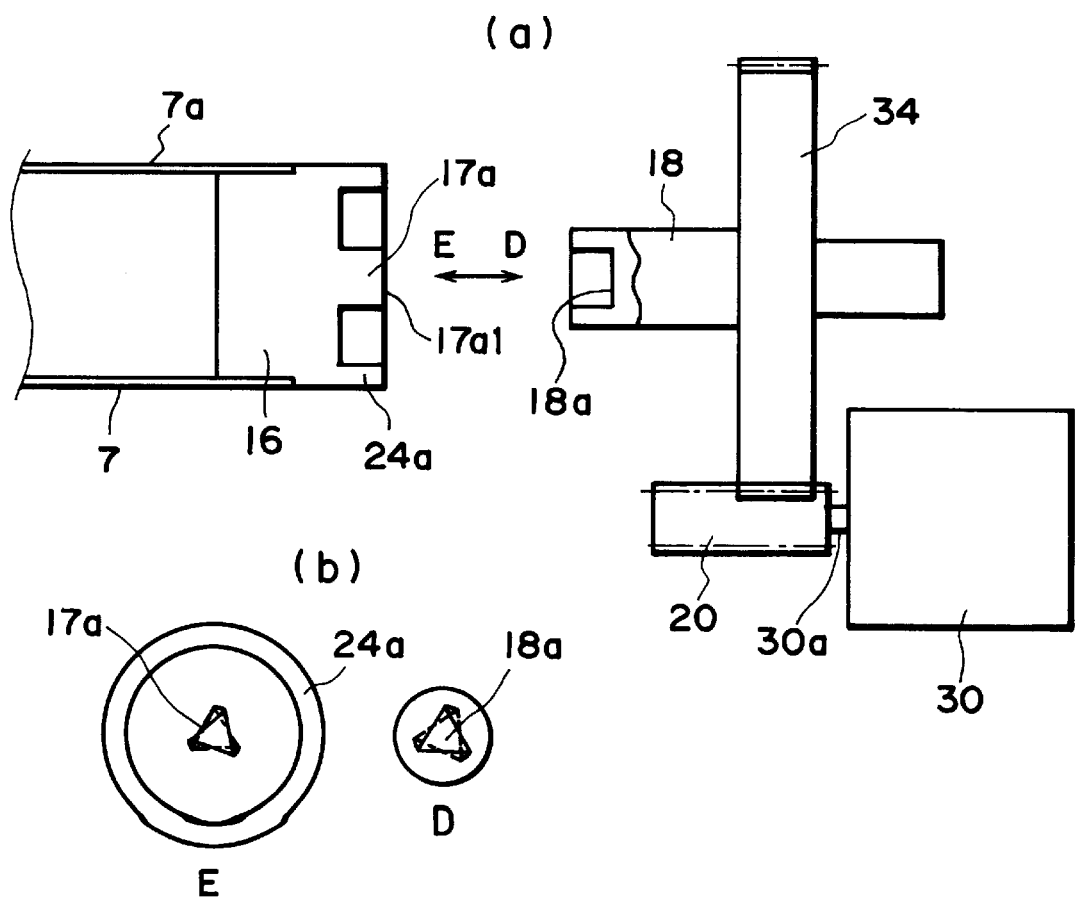
FIGS. 23(a) and (b) are views of a male shaft in the form of a twisted triangular prism provided on the process cartridge and an engageable female shaft provided in the main assembly of a device, according to an embodiment of the present invention.

Referring to FIG. 23, a description will be provided as to a further embodiment. The embodiment of FIG. 23 is different from embodiment 1 in that the gear is not provided on the drum flange 16.

The coupling structure shown in FIGS. 3, (a) and (b), is such that the main assembly side coupling means is a female coupling shaft 17 of polyacetal (POM), and the coupling means of the cartridge side engageable therewith is a male coupling shaft 18 of POM. A cylindrical wall portion 24 concentric with the photosensitive drum 7 is formed integrally with the flange 16 and is provided around the male coupling shaft 18. FIG. 3, (b) is a view as seen in the directions D and E of FIG. 3, (a).

By the provision of a wall portion 24 having substantially the same height as the projection 18a around the male shaft 18, the projection 18a is not projected out beyond the cartridge frame, so that the damage of the end portion of the projection 18a can be prevented.

The cylindrical wall portion 24 may also function as a guide for facilitating the mounting of the process cartridge B to the image forming apparatus A (FIG. 6, guide c), as described in the foregoing.

Embodiment 7

Figure 24:
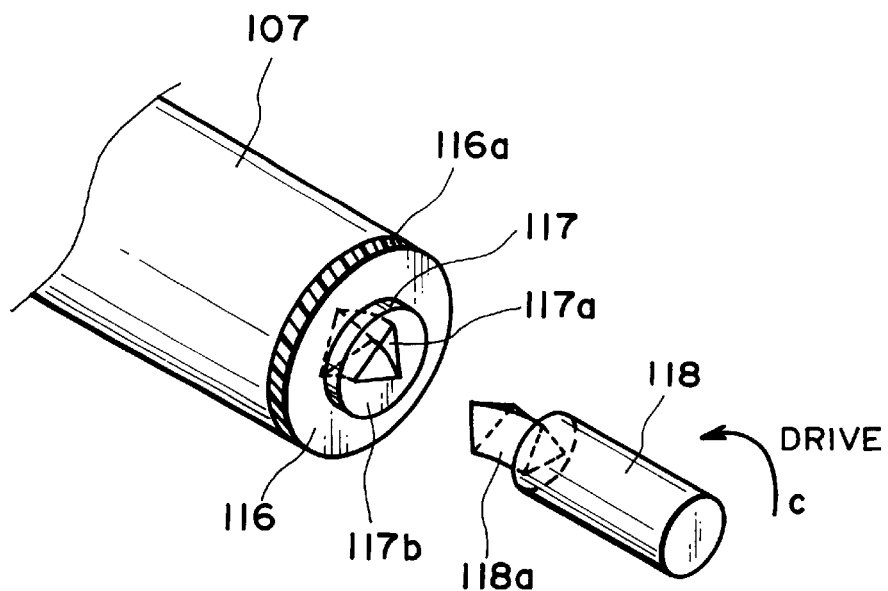
FIG. 24 is a perspective view of a twisted recess having a cross-section in the form of a triangle shape on the process cartridge, and a projection in the form of a complementary twisted triangular prism in the main assembly of the device, according to and embodiment of the present invention.
Figure 25:
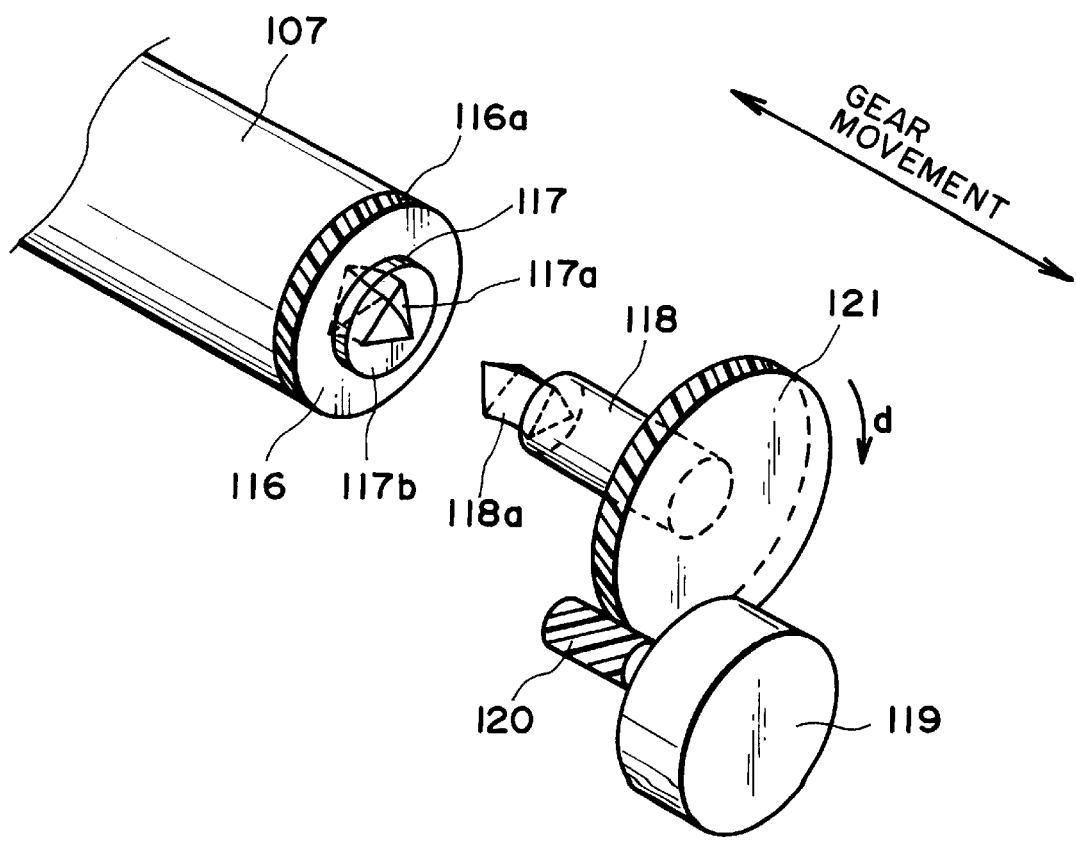
FIG. 25 is a perspective view of a driving mechanism of the coupling of FIG. 24.

Referring to FIGS. 24 and 25, another embodiment will be described. In this embodiment, as contrasted to the above-described embodiment, the drum flange 116 of the photosensitive drum 7 is provided with a female shaft 117, and the large diameter gear 121 of the main assembly 13 of the apparatus is provided with a male shaft 118. The rotation accuracy can be improved, with this structure, too.

As shown in FIG. 24, the substantially positive triangular prism of the projection 118a of the male coupling shaft 118 is twisted in the rotation direction, and the recess 117a of the female coupling shaft 117 is twisted correspondingly in the rotation direction. A seat 117b is provided at the end surface of the female coupling shaft 117.

By the twisting of the engaging portion in the rotation direction, the male coupling shaft 118 pulls the female shaft 117 until it abuts the seat 117b when the male coupling shaft 118 is rotated in the direction c for image formation while they are engaged. As a result, the combination therebetween is further assured.

When the process cartridge B is demounted from the main assembly 13, motor 119 may be rotated in the opposite direction indicated by arrow d, by which the engagement of the coupling is automatically released by the thrust produced by the meshing between the pinion gear 120 having helical teeth and the transmission gear 121, as shown in FIG. 25.

In this example, if the tolerable transmission torque of the female shaft 117 is smaller than the tolerable transmission torque of the male shaft 118, the damage of the male shaft 118 can be prevented.

For example, the female coupling shaft provided in the cartridge is made of polyacetal (POM), and the male coupling shaft constituted in the main assembly is made of zinc die-cast. By doing so, even if an abnormal torque is produced, the damage of the male shaft is prevented since the tolerable transmission torque of the male coupling shaft of the main assembly side is large.

This embodiment is the same as embodiment 1 except that the female shaft is provided in the drum flange, and the male shaft is provided in the main assembly. Therefore, the embodiments of the electrophotographic image forming apparatus, the process cartridge, the drive transmission part and the electrophotographic photosensitive drum are the same as those of embodiment 1, except that the male shaft of the drum flange is replaced with the female shaft, and the female shaft of the gear of the main assembly is replaced with the male shaft, and therefore, the description of such embodiments are omitted for simplicity.

However, the process cartridge will be described briefly. It is a process cartridge B which is detachably mountable to a main assembly 13 of an electrophotographic image forming apparatus A. The electrophotographic image forming apparatus A comprises a motor 30 (119), the main assembly helical gear 34 (121) for receiving the driving force from the motor 30 (119), and a twisted triangular prism projection 118a integrally rotatable with the main assembly helical gear provided at the main assembly helical gear of the main assembly helical gear 34 (121). The electrophotographic image forming apparatus A operates to form an image on the recording medium. The process cartridge B comprises cartridge frames 12a, 12b and 12c, the electrophotographic photosensitive drum 7 (107), the charging roller 8 for charging the electrophotographic photosensitive drum 7 (107), the cleaning blade 11a for removing the residual toner from the electrophotographic photosensitive drum 7 (107), the developing roller 10d for developing the latent image formed on the electrophotographic photosensitive drum 7 (107), a twisted triangular hole 117a engageable with the projection 118a provided at a longitudinal end of the electrophotographic photosensitive drum 7 (107), wherein the process cartridge B is mounted to the main assembly, and when the main assembly helical gear 34 (121) is rotated with the hole 117a engaged with the projection 118a, the rotational force is transmitted from the main assembly helical gear 34 (121) to the drum 7 (121) while the hole 117a is kept pulled toward the projection 118a. The hole 117a is formed as a recess at a leading edge of the shaft portion 17 (117) provided at the central portion of the drum helical gear 16a (116a). The drum helical gear 16a (116a) functions to transmit the rotation force to the developing roller 10d. The shaft portion 17 (117) functions to rotatably support the electrophotographic photosensitive drum 7 (107) on the cartridge frame 112c. The drum helical gear 16 (116a) of the hole 117 and the shaft portion 17 (117) are integrally formed from resin material. Outer diameter D1 of the electrophotographic photosensitive drum 7 (107), the outer diameter F of the shaft portion, and the diameter C of the circumscribed circle of the hole configuration 117a, satisfy D1>F>C.

The outer diameter F of the shaft portion 17 (117), the diameter C of the circumscribed circle of the hole configuration, the dedendum diameter G of the gear 16a of the electrophotographic photosensitive drum 7, and the inner diameter D2 of the electrophotographic photosensitive drum 7, satisfy G>D2 and G>F>C. The outer diameter D1 of the electrophotographic photosensitive drum 7 (107), and the dedendum circle diameter L of the main assembly gear 34 (121), L is preferably not less than approximately 1.0 times D1 and not more than 5.0 times D1. The module of the main assembly gear 34 (121) is approximately 0.4–0.7. The dedendum diameter L of the main assembly gear of the device is approximately 30 mm–150 mm, and the number of teeth of the main assembly gear 34 is approximately 40 teeth–400 teeth.

In this example, the direction of twisting of the projection 118a as seen from the photosensitive drum 7 (107) is the same as the rotation direction of the photosensitive drum 7 (107) in the direction from the base portion of the projection 118a toward the end, and that of the hole 117a is the same in the direction from the inlet of the hole 117a toward the inside thereof. The twisting direction of the drum flange 16a (116a) is opposite from the twisting direction of the hole 117a.

Embodiment 8

Figure 26:
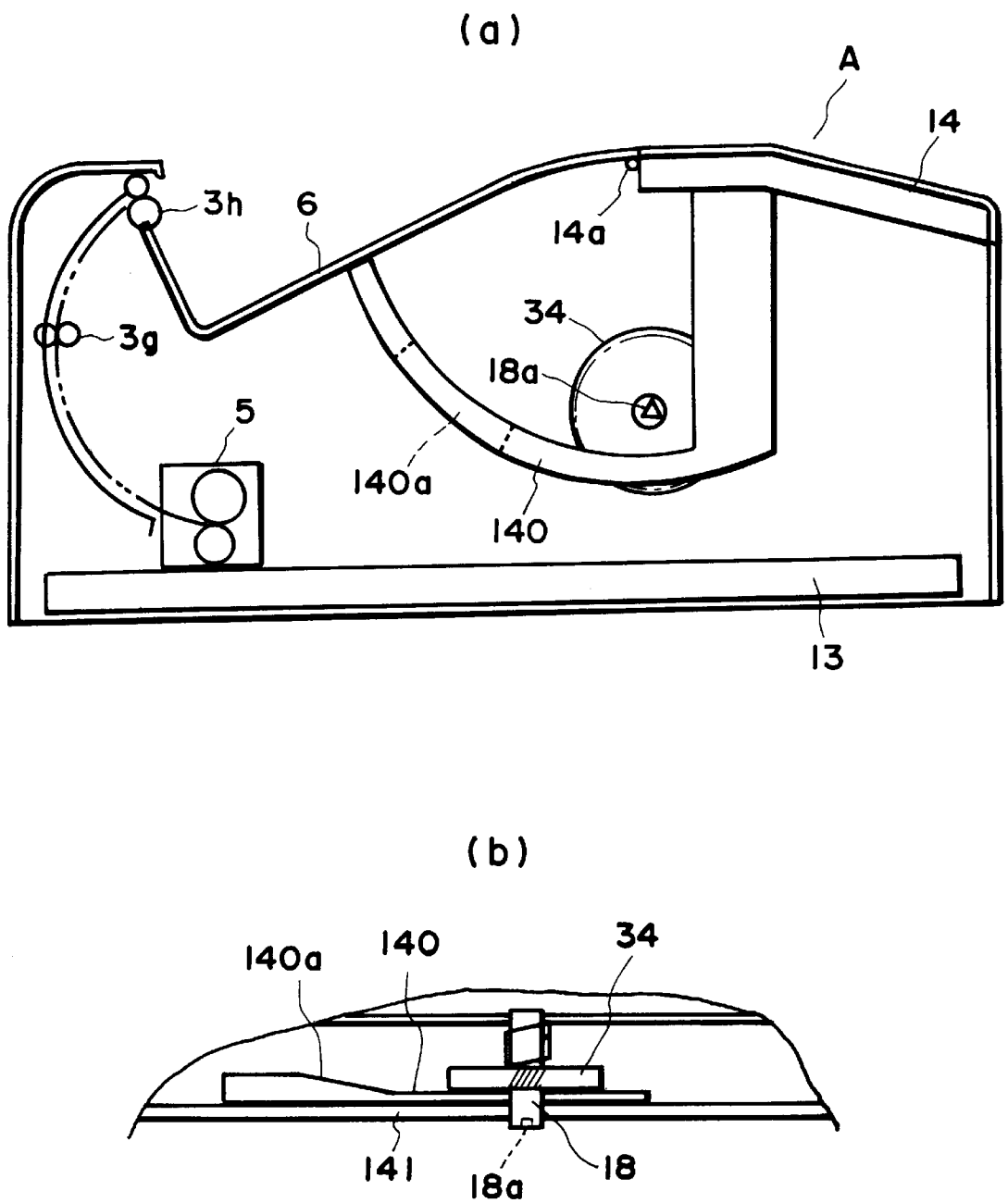
FIGS. 26(a) and (b) illustrate an interrelation mechanism of a driving means and an openable cover according to an embodiment of the present invention.
Figure 27:
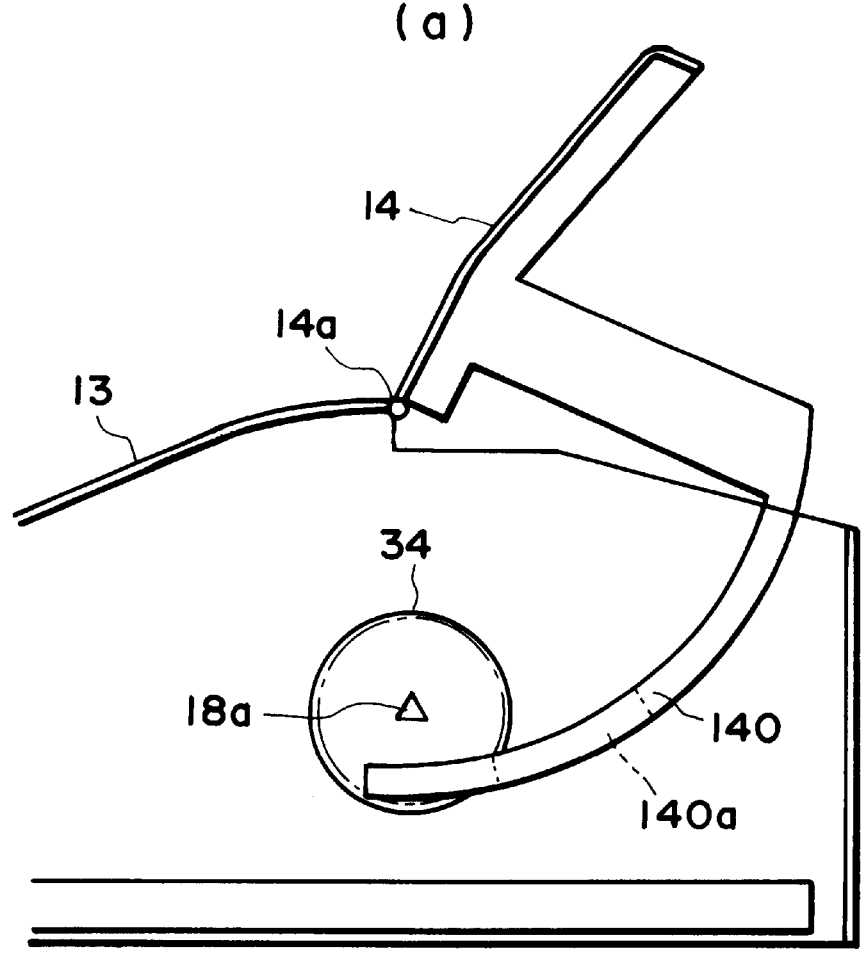
FIGS. 27(a) and (b) illustrate an interrelation mechanism of driving means and an openable cover according to an embodiment of the present invention.
Figure 27:
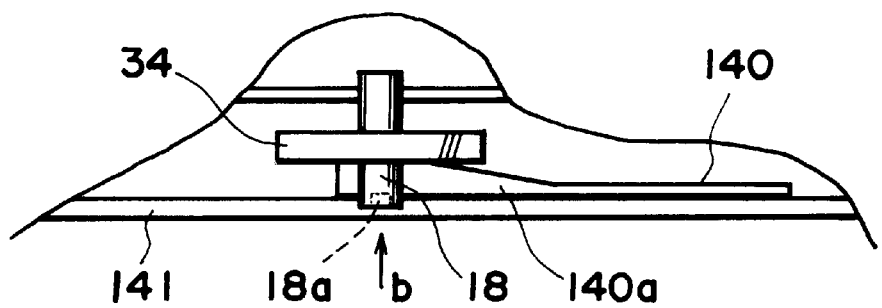

In embodiment 1, when the cover 14 is opened, the rod 37 and the cam 35 are operated in interrelation therewith to release the engagement between the coupling projection 17a and the recess 18a. The coupling release structure may be as disclosed in FIGS. 26 and 27.

The openable cover 14 is provided with an arcuate releasing member 140 at the center of the shaft 14a, as shown in FIG. 6, (a), and the leading edge of the releasing member 140 is formed into a cam portion 140a having a gradually increasing thickness, as shown in FIG. 6, (b). As shown in FIGS. 7, (a) and (b), when the cover 114 is opened to demount the process cartridge B, the cam portion 140a enters the space between the wall portion 141 and the gear 34 integral with the female shaft 18 to push the side surface of the gear 34 out in the direction indicated by arrow b in FIG. 27. By this arrangement, the female shaft 18 is retracted from the wall portion 141 so that the engagement with the male coupling shaft 17 of the photosensitive drum 7 is released to permit smooth demounting of the process cartridge B.

The member for mounting the releasing member 140 is not limited to the openable cover 14 if it is a member operated when the process cartridge B is mounted or demounted. When the drive transmission gear 34 is a helical gear, the releasing member 140 is not inevitable, and the coupling release is possible by the thrust produced by the helical gear.

Referring to FIGS. 28–31, a description will be provided as to positioning of the process cartridge relative to the main assembly of the apparatus 13 in the longitudinal direction of the photosensitive drum.

The following embodiment, different reference numerals are used, but the structure is quite similar to the foregoing embodiment. However, the positioning of the process cartridge B relative to the main assembly of the apparatus in the longitudinal direction of the photosensitive drum, will be described in more detail. Some part of the description will be repeated for easy understanding.

Figure 28:
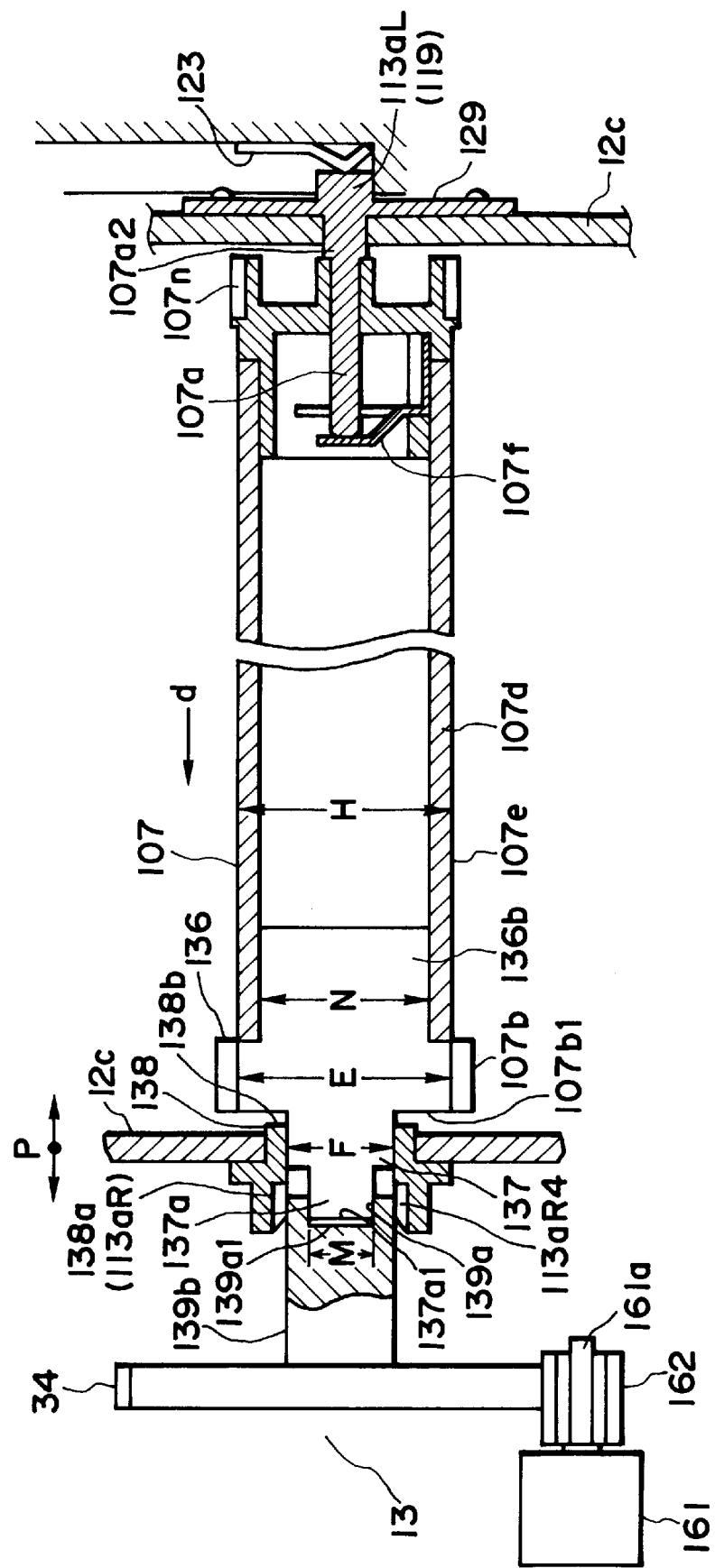
FIG. 28 is a longitudinal sectional view of a photosensitive drum and a driving device therefor.

FIG. 28 is a longitudinal sectional view of a coupling portion in the state of the photosensitive drum 107 being mounted to the process cartridge B.

As shown in FIG. 28, there is provided a coupling means on the cartridge at one longitudinal end of the photosensitive drum 107 mounted the process cartridge B. The coupling means is in the form of a male coupling shaft 137 (circular column configuration) provided on a drum flange 136 fixed to the end of the photosensitive drum 107, and a free end surface of the male shaft 137 has a projection 137a. A free end surface of the projection 137a is parallel with the end surface of the male shaft 137. The male shaft 137 is supported by a bearing 138 and functions as a drum shaft. In this example, the drum flange 136, the male coupling shaft 137, and the projection 137a, are integral. The drum flange 136 is provided with an integral drum gear 107b in the form of a helical gear to transmit the driving force to a developing roller 9c10d (FIG. 2) in the process cartridge B. Therefore, as shown in FIG. 28, the drum flange 136 of this embodiment, is an integrally molded member having the drum gear 107b, the male shaft 137 and the projection 137a, and is a driving force transmission part for transmitting the driving force.

The configuration of the projection 137a is, similarly to the foregoing embodiment, a twisted prism. The recess 139a for engaging with the projection 137a is a polygonal (cross-section) hole slightly twisted in the rotational direction along the axial direction. The projection 137a and the recess 139a have the same twisting pitches, and are twisted in the same direction. The recess 139a has a substantially triangular cross-section. The recess 139a is provided on a female coupling shaft 139b integral with the gear 34 provided in the 13. The female coupling shaft 139b, as has been described hereinbefore, is supported by the main assembly of the apparatus for rotation and for axial movement. With the structure of the example, when the process cartridge B is mounted to the main assembly of the apparatus, and the projection 137a and the recess 139a of the main assembly of the apparatus are engaged with each other to transmit the rotating force from the recess 139a to the projection 137a, the edge line of the projection 137a of the substantially equilateral triangular prism and the inner surface of the recess 139a are contacted uniformly. To accomplish this, the diameter of the circumscribed circle of the coupling projection 137a is larger than that of the inscribed circle of the coupling recess 139a, and is smaller than that of the circumscribed circle of the coupling recess 139a. Furthermore, because of the configuration of the twisting, a force is produced in a direction of the recess 139a attracting the projection 137a so that free end surface of the projection 137a1 is brought into contact with the bottom surface of the recess 139a. By this, the positions of the process cartridge is determined in the longitudinal and radial directions of the photosensitive drum 7 relative to the main assembly 14 of the image forming apparatus. Therefore, the position of the process cartridge B relative to the main assembly of the apparatus in the longitudinal direction of the photosensitive drum 7, is determined. The twisting direction of the drum gear 107b is the direction in which a thrust force is produced in the direction of the arrow d, in this example. The thrust forces in the coupling portion and the drum gear 107b, are both directed as indicated by the arrow d, and therefore, the position of the photosensitive drum 7 integral with the projection 137a in the axial and radial directions, is stably determined in the main assembly 13 of the image forming apparatus.

In this example, the twisting direction of the projection 137a is opposite from the rotational direction of the photosensitive drum 107 toward the free end away from the bottom trunk of the projection 137a, as seen from the photosensitive drum 107; and the twisting direction of the recess 139a is opposite therefrom toward the inside away from the inlet of the recess 139a. The twisting direction of the drum gear 107b of the drum flange 136 is opposite from the twisting direction of the projection 137a.

The male shaft 137 and the projection 137a are disposed on the drum flange 136 such that when the drum flange 136 is mounted to the end of the photosensitive drum 107, they are coaxial with the photosensitive drum 107. Designated by 136b is a fixing portion where the drum flange 136 is fixed to the inner surface of the drum cylinder 107d when the drum flange 136 is mounted to the photosensitive drum 107. The fixing of the drum flange 136 to the photosensitive drum 107, may be by crimping or bonding. The circumferential surface of the drum cylinder 107d is coated with a photosensitive layer 107e.

As described in the foregoing, the other end of the photosensitive drum 107 is provided with a spur gear 107n fixed thereto.

The material of the drum flange 136 and the spur gear 107n may be polyacetal, polycarbonate, polyamide, polybutylene terephthalate or anther resin material. Another material may be used.

Around the projection 137a of the male coupling shaft 137 of the process cartridge B, there is provided a cylindrical projection 138a (cylindrical guide 113aR) coaxial with the male shaft 137 and integral with the bearing 138 fixed to the cleaning frame 12c. By the projection 138a, the projection 137a of the male coupling shaft 137 is protected upon the mounting-and-demounting of the process cartridge B, or the like, thus protecting it from damage or deformation or the like due to the external force. The play or the vibration during the coupling driving due to the damage of the projection 137a, can be prevented.

The bearing 138 may function also as a guiding member for mounting-and-demounting of the process cartridge B relative to the main assembly 13 of the image forming apparatus. More particularly, when the process cartridge B is mounted to the main assembly 13 of the image forming apparatus, the projection 138a of the bearing 138 is contacted to the guide portion 15c (FIG. 6) of the main assembly, so that projection 138a functions as a positioning guide to the mounting position to facilitate the mounting thereof to main assembly 13. When the process cartridge B is mounted to the mounting position, the projection 138a is supported in the positioning groove 15d provided in the guide portion 15c.

Among the photosensitive drum 107, drum flange 136 and the male coupling shaft 137, there is a relationship as shown in FIG. 28. More particularly, H>F≧M, and E>N where H is an outer diameter of the photosensitive drum 107; E is a dedendum circle diameter of the drum gear 107b; F is a bearing diameter of the photosensitive drum 107 (the outer diameter of the shaft portion male coupling shaft 137, and the inner diameter of the bearing 138); M is a circumscribed circle diameter of the coupling projection 137a; and N is a diameter of the engaging portion of the photosensitive drum 107 with the drum flange 136 (drum inner diameter).

By H>F, the sliding load torque at the bearing portion is smaller than in the case of bearing the drum cylinder 107d; by F≧M, the molding structure can be simplified because there is no undercut portion when a mold for the flange is divided in the direction of the arrow p as usual.

Furthermore, by the relation of E>N, the mold having the configuration of the gear portion is disposed on the left side mold as seen in the mounting direction of the process cartridge B, and therefore, the right-hand side mold may be simple, thus improving the durability of the mold.

On the other hand, the main assembly 13 of the image forming apparatus is provided with a coupling means of the main assembly. The coupling means of the main assembly has a female coupling shaft 139b (in the form of a circular column) (FIG. 28) at a position in alignment with the rotation axis of the photosensitive drum when the process cartridge B is insertion thereinto. The female coupling shaft 139b, as shown in FIG. 28, is a driving shaft integral with a large gear 34 for transmitting the driving force from the motor 161 to the photosensitive drum 107, and the female shaft 139b is projected from one side of the large gear 34 coaxially therewith. In this embodiment, the large gear 34 and the female coupling shaft 139b are integrally produced by a mold.

The large gear 34 in the main assembly 13 is a helical gear, which is in meshing engagement with a small helical gear 162 integral with or fixed to the shaft 161a of the motor 161. The gears have such twisting directions and the inclination angles that when the driving force is transmitted from the small gear 162, thrust is produced tending to move the female shaft 139b toward the male shaft 137. By this, when the motor 161 is driven upon image formation, the thrust is effective to move the female shaft 139b toward the male shaft 137 so as to engage the recess 139a with projection 137a. The recess 139a is disposed at a free end of the female shaft 139b and at the center of rotation of the female shaft 139b.

In this embodiment, the driving force is directly transmitted from the small gear 162 provided on the motor shaft 161a to the large gear 34, but this is not inevitable, and a gear train is usable for speed reduction and drive transmission. Other alternatives include a belt-pulley, a pair of friction rollers, a timing belt plus pulley, or the like.

In FIG. 28, designated by 119 is a drum grounding contact. The grounding contact 119 is coaxially provided with the drum shaft 107a integral with the flange 129 of an electroconductive material. To the drum shaft 107a, a grounding plate 107f electrically connected with the drum cylinder 107d, is press-contacted so that charge is discharged to outside. In this example, the flange 129 is of metal such as iron.

An end 107b1 of the drum gear 107b abuts an inside end surface 138b of the bearing 138 fixed to the cleaning arm 12c. By this, the axial position of the photosensitive drum 107 is determined in the process cartridge B.

A description will be provided as to a configurations of the projection 137a and the recess 139a which constitute an engaging portion of the coupling means.

The female coupling shaft 139b in the main assembly 13 is movable in the axial direction, as has been described hereinbefore, but is not movable in the radial direction (radial direction). On the other hand, the process cartridge B is mounted in the main assembly 13 for movement in the longitudinal direction and in the cartridge mounting direction. In the longitudinal direction, the process cartridge B is slightly movable between the guiding members 116R, 116L provided in the cartridge mounting space.

When the process cartridge B is mounted to the main assembly 13, a cylindrical shaft 113aL (FIG. 28) formed on the flange 129 at the other longitudinal end of the cleaning frame 12c is engaged into a positioning groove 15b (FIG. 5) of the main assembly 13 without a gap, so that correct positioning is provided, and a spur gear 107n fixed to the photosensitive drum 107 is brought into meshing engagement with a gear (not shown) for transmitting the driving force to the transfer roller 4 (FIG. 1). On the other hand, at the driving side of the photosensitive drum 107, a cylindrical guide 113aR provided on the cleaning frame 12c, is supported by the positioning groove 15d (FIG. 5).

By the cylindrical guide 113aR being supported by the positioning groove 15d of the main assembly 13, the axes of the drum shaft 107a and the female shaft 139b are aligned within concentricity of 2.00 mm, and a first alignment function in the coupling process is completed.

By closing the openable cover 14, the coupling recess 139a moves horizontally to enter the projection 137a (similar to the he state shown in FIG. 16).

Subsequently, the driving side (coupling side) is positioned, and the drive transmission is carried out, in the following manner.

When the driving motor 161 of the main assembly 14 is rotated, the female coupling shaft 139b is moved toward the male coupling shaft 137 (the direction opposite from the direction of arrow d in FIG. 28), and at the time when the phases are aligned between the male coupling shaft 137 and the recess 139a (in this example, since the projection 137a and the recess 139a have substantially equilateral triangle cross-sections, the phases are aligned for each 120 degrees), they are engaged with each other, so that rotational driving force is transmitted from the main assembly of the apparatus to the recess 139a (from the sate shown in FIG. 17 to the state shown in FIG. 16).

When the coupling projection 137a enters the recess 139a, the entering action is smooth, since the sizes of the substantially equilateral triangles are such that cross-section of the coupling recess 139a is larger than that of the coupling projection 137a.

If, however, the gap therebetween is too large, the rigidity of the coupling against the twist is lowered because of:

(1) the decrease of the rigidity due to change of the cross-sectional configuration of the projection 137a; and (2) the increase of resistance at the contact point due to the decrease of the contact portion radius.

If this occurs, the resultant images would not be uniform.

In this embodiment, in view of the desirable twisting rigidity, the lower limit value of the inscribed circle diameter of the triangular shape of the projection is 8.0 mm, and the inscribed circle diameter used is 8.5 mm, and the inscribed circle diameter of the recess triangular shape is 9.5 mm, and therefore, the gap is 0.5 mm.

When the gap is small, a quite high concentricity has to be accomplished before the engagement.

In this embodiment, the concentricity of 1.0 mm is accomplished with the gap of 0.5 mm to permit the proper engagement. To accomplish this, the projection length of the bearing projection 138 is made larger than that of the coupling projection 137a. In addition, by a plurality of (not less than three) projected guides 113aR4 in the bearing projection 138a, the outer diameter portion of the female shaft 139a is guided, so that concentricity between the projection 137 and the female shaft 139a before the coupling engagement, is made not more than 1.0 mm, thus stabilizing the engaging process of the coupling (second alignment function).

When the female coupling shaft 139b is rotated at the time of image formation with the coupling projection 137a in the recess 139a, the inner surface of the coupling recess 139a and the three edge lines of the substantially equilateral triangle column of the projection 137a, are contacted to permit the driving force transmission. The male coupling shaft 137 instantaneously moves such that edge lines and the inner surface of the coupling recess 139a are uniformly contacted, that is, the axes of the male coupling shaft 137 and the female shaft 139b are aligned.

Thus, an automatic alignment is accomplished between the male coupling shaft 137 and the female shaft 139b upon the driving of the motor 161. By the transmission of the driving force to the photosensitive drum 107, a rotating moment is applied to the process cartridge B, and is effective to increase the contact force between a regulating abutment 12c1 on the upper surface of the cleaning frame 12c of the process cartridge B and the fixing member 13a (FIG. 1) fixed to the main assembly 13 of the image forming apparatus, thus positioning the process cartridge B precisely relative to the main assembly 13 of the image forming apparatus.

When the driving is not effected, that is, when no image is formed, the engagement and disengagement of the coupling are easy, since the gap is provided in the radial direction between the coupling projection 137a and the recess 139a. During the driving, the contact force in the coupling portion is stabilized so that possible play or vibration there are suppressed.

In this embodiment, the configurations of the coupling projection and the recess are substantially an equilateral triangle, but the similar effects are provided if they are substantially an equilateral polygonal. The equilateral polygonal shape is preferable since the positioning is precise, but non-equilateral shape is usable if a force toward each other is produced. As an alternative, a screw having a large lead is usable as the coupling projection, wherein a female screw for threading engagement with the coupling projection is usable as the coupling recess. A three-lead triangle screws of male and female shapes of this modification, corresponds to the above-described coupling projection and the recess.

When the coupling projection and the recess are compared, the projection is easily damaged, and is lower from the standpoint of strength than the recess. Therefore, in this embodiment, the coupling projection is provided in the exchangeable process cartridge B, and the coupling recess which is required to have a higher durability is provided in the main assembly 13 of the image forming apparatus.

A description will be provided as to the positioning of the process cartridge B in the longitudinal direction of the photosensitive drum relative to the main assembly 13 of the apparatus.

In this embodiment, the recess 139a of the female coupling shaft 139b attracts the projection 137a of the male coupling shaft 137 so that the end surface 137a3 of the shaft portion 137 and the end surface 139a3 of the recess 139a, abut each other, by which the photosensitive drum 107 is positioned in place in the axial direction.

To permit this axial position by the abutment between the projection end portion 137a3 and the surface 139a3 of the recess 139a, the photosensitive drum 107 is movable in the axial direction relative to the main assembly 13. This will be described in more detail.

The usable arrangements for permitting the movement in the longitudinal direction of the photosensitive drum 107 are as follows.

With respect to the shaft coupling for transmitting the rotating force to the process cartridge B from the main assembly of the apparatus, the female coupling shaft 139b as the driving side shaft coupling member is such that coupling recess 139a attracts the projection 137a in the axial direction upon the rotation while the recess 139a and the projection 137a are in engagement with each other.

(1-a) the photosensitive drum 107 is movable in the longitudinal direction relative to the cartridge frame, more particularly, the cleaning frame 12c; or (1-b) the photosensitive drum 107 is not movable in the longitudinal direction relative to the cleaning frame 12c.

(2-a) the cartridge frame of the process cartridge B, more particularly, the cleaning frame 12c supporting the photosensitive drum 107 is movable in the longitudinal direction relative to the cartridge mounting portion of the main assembly 13 of the apparatus, when the process cartridge is mounted to the main assembly 13. (2-b) the cleaning frame 12c is not movable in the longitudinal direction, when the process cartridge is mounted to the cartridge mounting portion of the main assembly of the apparatus.

In this embodiment, the end surface 137a1 of the projection 137 does not abut the bottom surface of the recess 139a to accomplish the positioning. Rather, in this embodiment, the positioning is effected by the abutment between the end surface 137a3 of the shaft portion 137 provided with the projection 137a and the end surface 139a3 of the recess 139a. Here, the shaft portion 137 is a center of rotation of the rotatable member (photosensitive drum 107). In this embodiment, the photosensitive drum is rotatably supported on the cartridge frame (cleaning frame 12c). The end surface 137a3 is a surface of the shaft portion 137 around the projection 137a thereof. The end surface 139a3 of the recess 139a is a surface around the recess 139a of the female shaft 139b having the recess 139a. Here, the female shaft 139b is a center of rotation of the rotatable member (gear 34) provided in the main assembly 13 of the apparatus. In this embodiment, it functions to transmit the driving force to the photosensitive drum 107. The positional relation between the photosensitive drum 7 and the frame of the process cartridge B, will be described in detail, referring to the drawings. In the drawing which will be referred to, the shaft coupling, process cartridge B and the cartridge mounting portion of the main assembly of the apparatus, are schematically shown. When the photosensitive drum 107 is moved toward the non-driving side, the axial movement of the photosensitive drum 107 is stopped by a stepped portion at the boundary of the expanded diameter portion 107a2 of the drum shaft 107a, in this embodiment. However, with such a positional relation, the projection 137a and the recess 139a are engaged, and the end surface of the projection 137a1 and the recess the bottom surface 139a1 are spaced apart. Therefore, the axial movement toward the non-driving side of the photosensitive drum 107 is determined in effect by the cleaning frame 12c, and therefore, the following description will be provided as to the relation between the photosensitive drum 107 and the cleaning frame 12c.

Figure 29:
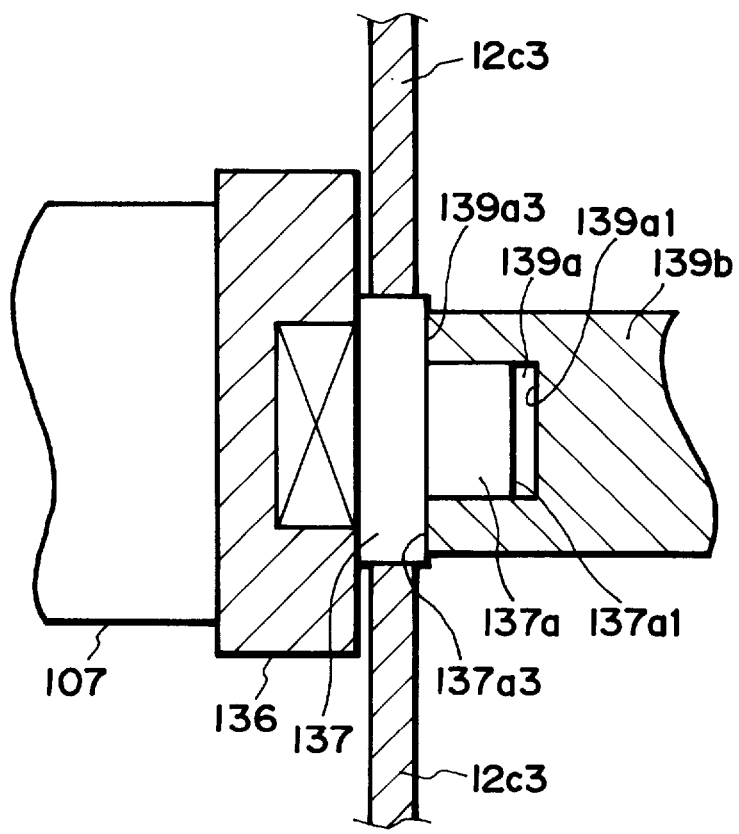
FIG. 29 is a schematic plan view showing a positioned state of a process cartridge relative to the main assembly of the apparatus in the longitudinal direction of a photosensitive drum.

As shown in FIG. 29, the end of the male coupling shaft 137 is provided with a projection 137a in the form of a twisted prism, in this embodiment. The female coupling shaft 139b is provided with a recess 39a in the form of a twisted hole having a polygonal cross-section. The configurations of the projection 137a and the recess 139a are similar to those of the foregoing embodiments. In this example, the height from the end surface 137a3 of the male shaft 137 of the projection 137a to the free end surface 137a1 of the projection 137a, is smaller than the depth from the end surface 139a3 of the female shaft 139b to the bottom surface 139a1 of the recess 139a. Therefore, when the recess 139a attracts the projection 137a, the end surface (shaft end) 139a3 of the male coupling shaft 139b abuts the end surface (shaft end of the male shaft 137) 137a3 of the male coupling shaft 137, so that the position of the photosensitive drum 107 in the longitudinal direction is determined. When the longitudinal position of the photosensitive drum 107 is determined, the cleaning frame 12c is urged in the direction opposite from the direction indicated by arrow d by the press-contact force between the drum shaft 107a and the grounding plate 107f, so that photosensitive drum side end 138b of the bearing 138 and the end 107b1 of the drum gear 107b are abutted, by which the position thereof is determined. Namely, the position of the process cartridge B relative to the main assembly of the apparatus in the longitudinal direction of the photosensitive drum 107, is determined.

Figure 30:
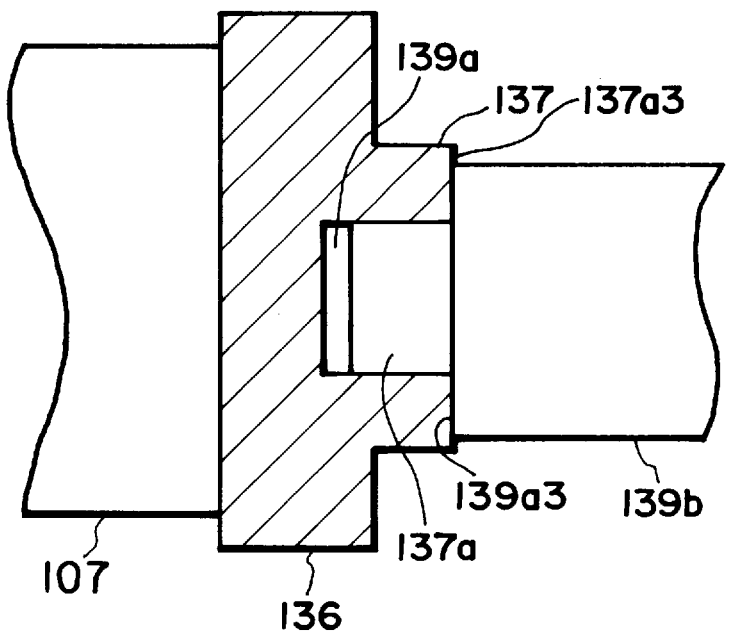
FIG. 30 is a schematic plan view showing a positioned state of a process cartridge relative to the main assembly of the apparatus in the longitudinal direction of a photosensitive drum.

In FIG. 30, the end surface (shaft end)137a3 of the male coupling shaft 137 is provided with a recess 139a, and the end surface (shaft end)39a3 of the female coupling shaft 139b is provided with a projection 137a. In this case, too, the height of the projection 137a is smaller than the depth of the recess 139a. In this example, too, the projection 137a of the female coupling shaft 139b attracts the recess 137a of the male coupling shaft 137, until the end surface 137a3 of the male coupling shaft 137 is abutted to the end surface 139a3 of the female coupling shaft 139b, so that the position of the photosensitive drum 7 in the longitudinal direction thereof, is determined. Namely, the position of the process cartridge B relative to the main assembly 13 of the apparatus in the longitudinal direction of the photosensitive drum 107, is determined.

In the foregoing, the photosensitive drum 107 is movable relative to the main assembly 13 in the longitudinal direction. In the case that photosensitive drum 107 is movable in the longitudinal direction, the following may be considered, referring to the foregoing combinations.

Figure 31:
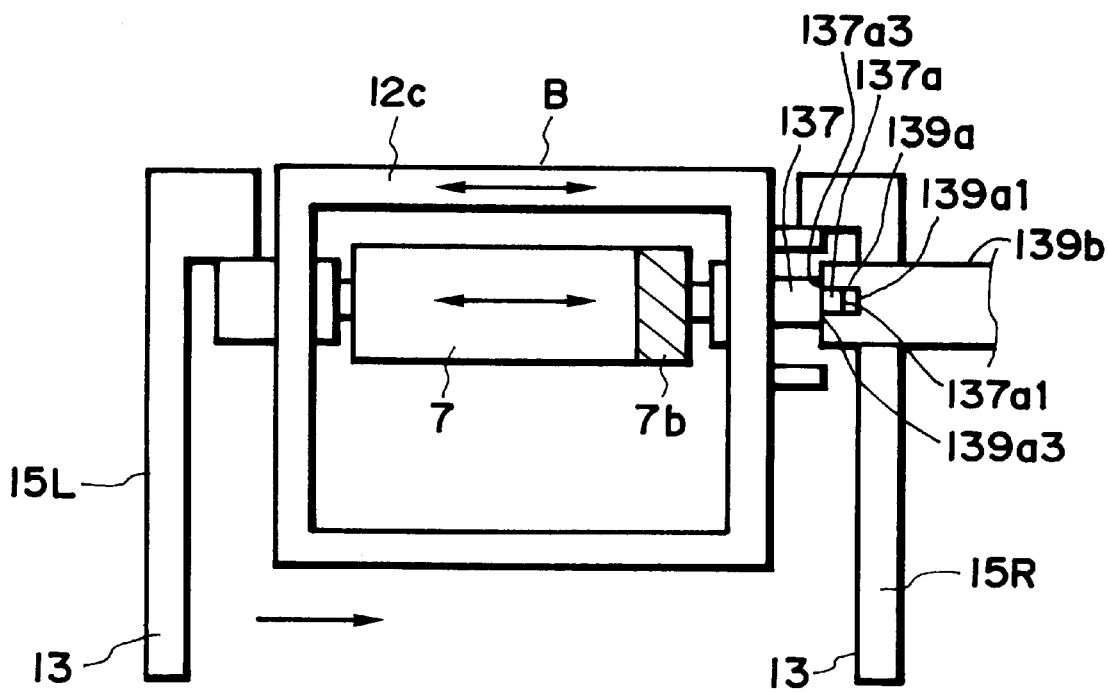
FIG. 31 is a schematic plan view showing a positioned state of a process cartridge relative to the main assembly of the apparatus in the longitudinal direction of a photosensitive drum.

FIG. 31 illustrates an example wherein the photosensitive drum 107 is supported in the cleaning frame 12c for movement in the longitudinal direction thereof, and the cleaning frame 12c is movable in the longitudinal direction between guiding members 15. In this case, when the shaft coupling is engaged, the male coupling shaft 137 is pulled toward the female coupling shaft 139b, and the male shaft end surface 137a3 abuts the female shaft end surface 139a3, while the end surface of the projection 137a1 does not abut the bottom surface 139a1 of the recess. By this, the axial position of the photosensitive drum 107 is determined.

Figure 32:
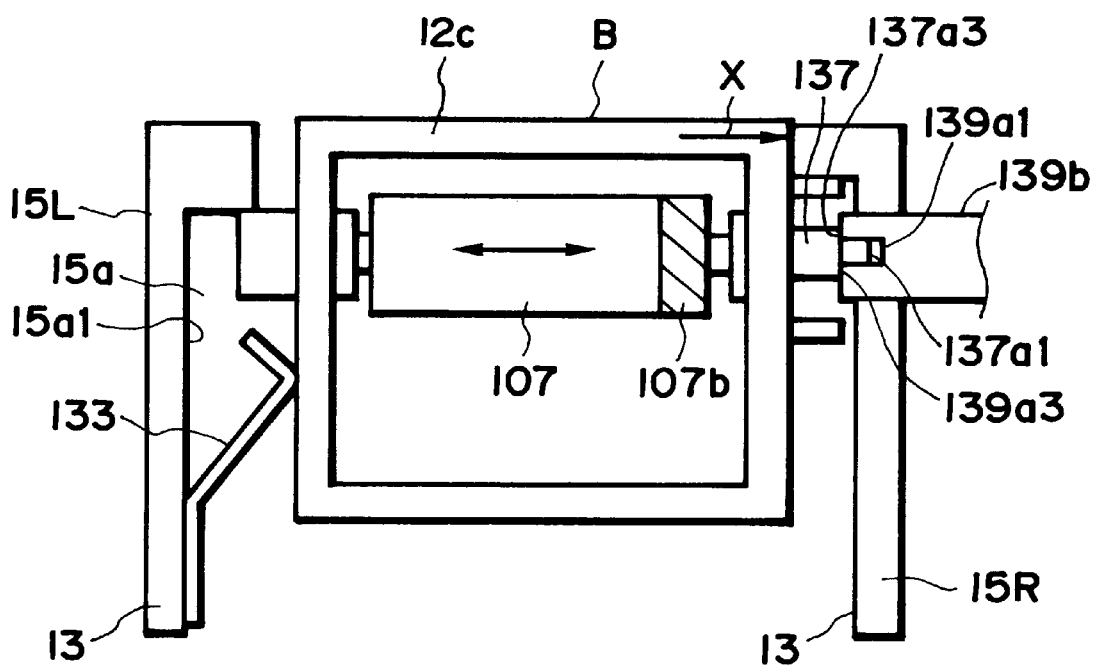
FIG. 32 is a schematic plan view showing a positional state of a process cartridge in a main assembly of an image forming apparatus in a longitudinal direction of a photosensitive drum.

FIG. 32 shows an example, wherein FIG. 30 shows a case wherein the photosensitive drum 107 is movable in the longitudinal direction relative to the cleaning frame 12c, and the cleaning frame 12c is not movable in the longitudinal direction relative to the cartridge mounting portion of the main assembly of the apparatus by the elastic force of the leaf spring 133 disposed between the cleaning frame 12c and the bottom 15a1 of the guide portion 15a. An arrow X indicates the contact portion between the guiding member 15R and the cleaning frame 12c. The same applies to the case wherein the leaf spring 133 is not used, but the cleaning frame 12c is snugly engaged between the guiding members 15, and therefore, the process cartridge B is not movable in the longitudinal direction relative to the main assembly of the apparatus. In these cases, when the shaft coupling is engaged, the male coupling shaft 137 is pulled toward the female shaft 139b, and the male shaft end surface 137a3 abuts the female shaft end surface 139a3, while the end surface of the projection 137a1 does not abut the bottom surface 139a1 of the recess. By this, the axial position of the photosensitive drum 7 is determined. Namely, the position of the process cartridge B relative to the main assembly 13 of the apparatus in the longitudinal direction of the photosensitive drum 107, is determined.

Figure 33:
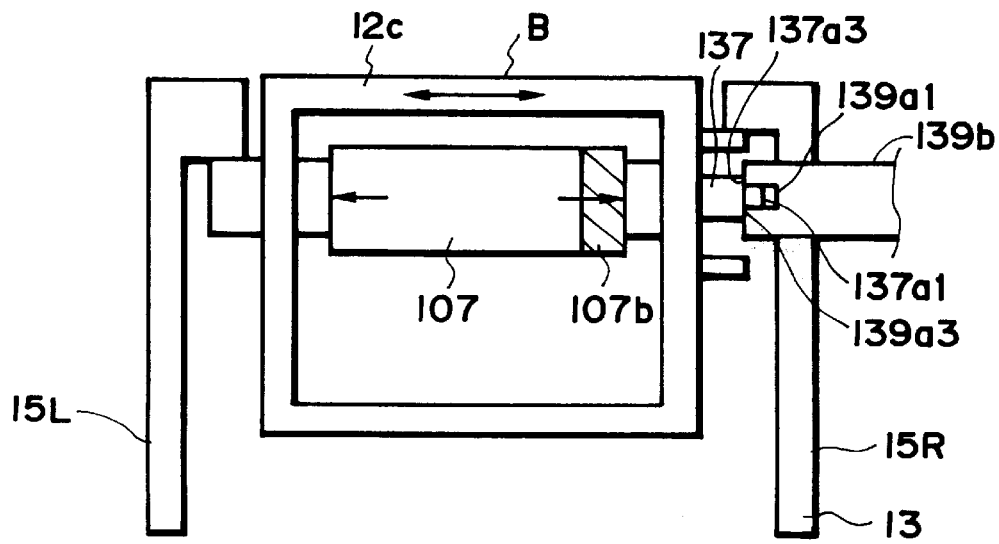
FIG. 33 is a schematic plan view showing a positional state of a process cartridge in a main assembly of an image forming apparatus in a longitudinal direction of a photosensitive drum.
Figure 34:
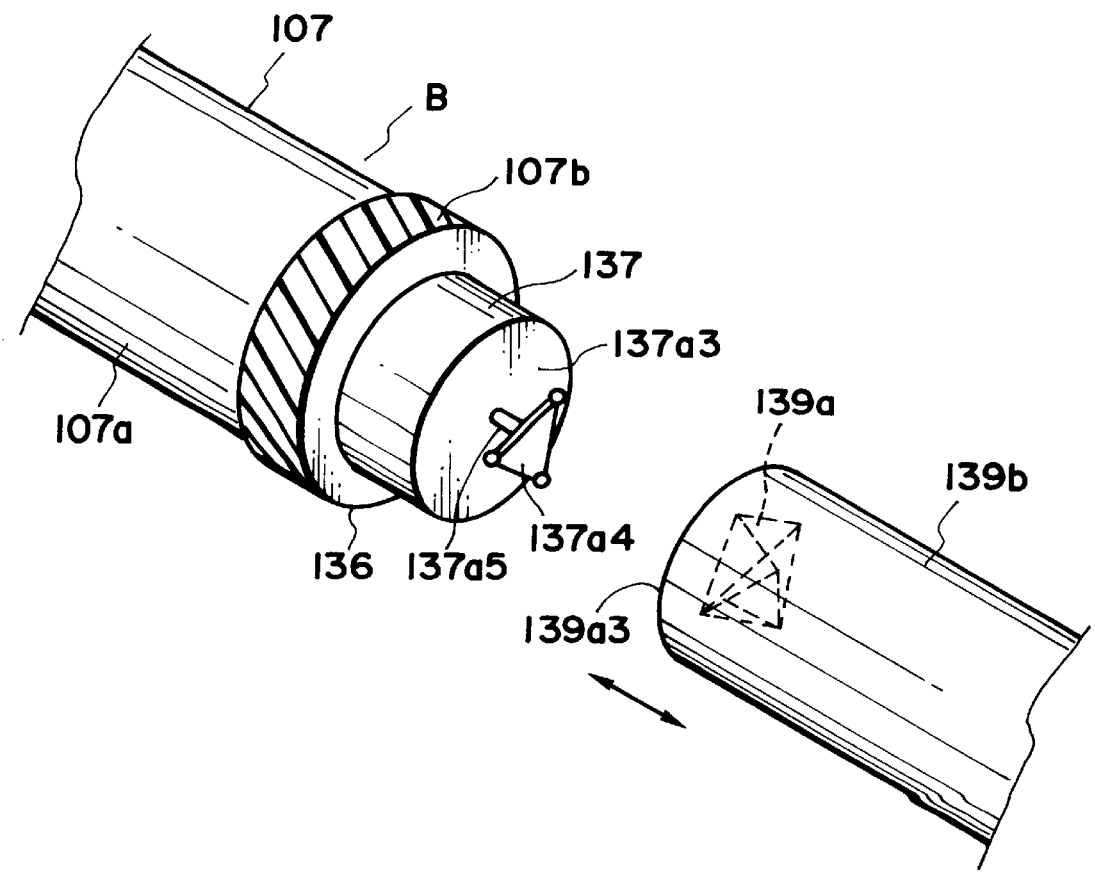
FIG. 34 is a perspective view of a coupling according to another embodiment of the present invention.

FIG. 33 shows an example, wherein the photosensitive drum 107 is supported in the cleaning frame 12c so that it is not movable in the longitudinal direction thereof relative to the cleaning frame 12c, and the cleaning frame 12c is movable in the longitudinal direction between the guiding members 15. In this case, when the shaft coupling is engaged, the male coupling shaft 137 is attracted toward the female coupling shaft 139b, and the male shaft end surface 137a3 abuts the female shaft end surface 139a3, while the end surface of the projection 137a1 does not abut the bottom surface 139a1 of the recess. By this, the axial position of the photosensitive drum 107 is determined. Namely, the position of the process cartridge B relative to the main assembly 13 of the apparatus in the longitudinal direction of the photosensitive drum 107, is determined.

Furthermore, since the twisting direction of the drum gear 107b is such that projection 137a is thrusted toward the recess 139a, the axial position of the photosensitive drum 107 is stabilized. Namely, the position of the process cartridge B relative to the main assembly of the apparatus in the longitudinal direction of photosensitive drum 107, is stably determined.

In the foregoing, the female coupling shaft 39b is driven by a gear train from the motor 61, but the driving method for the female coupling shaft 39b is not so limited. As shown in FIG. 46, a timing pulley 47 integral with the female coupling shaft 39b may be used wherein a timing belt 47a is trained around the timing pulley and an unshown timing pulley on a motor shaft of the motor 61.

As an another alternative, a chain may be trained around a chain wheel integral with the female coupling shaft 39b and an unshown chain wheel on the motor shaft of the motor 61.

In this example, the projection 37a is provided on the drum flange 36, and the recess 39a is provided in the shaft 39b disposed at the center of the large gear 34 of the rotatable member. It is an usable alternative that recess 39a is provided in the drum flange 36, and a projection 37a is provided on the shaft 39b disposed at the center of the large gear 34.

In the foregoing description, the twisting direction of the recess 39a namely the hole (projection) is such as to twist toward the bottom of the hole from the inlet thereof in the opposite direction from the rotational direction of the gear.

The twisting amount of the hole (projection) is 1°–15° in the rotational direction per axial length of 1 mm.

In this embodiment, the depth of the hole is approximately 4 mm, and the twisting amount is approximately 30°.

In the embodiments, the projection 137a is in the form of a polygonal prism. FIG. 32 shows an usable alternative wherein a supporting shaft 137a5 is provided at the center of the male shaft 137, and a non-twisted triangular plate 107a4 is mounted to the free end thereof, and is engaged into the twisted triangular hole of the recess 139a. With this structure, the triangle plate 107a4 is attracted to the recess 139a. By this, the end surface 137a3 of the shaft portion 137 and the end surface 139a3 of the recess 139a are abutted or contacted to each other. Therefore, the position of the photosensitive drum in the longitudinal direction thereof is determined relative to the main assembly 13 of the apparatus, namely, the position of the process cartridge B relative to the main assembly 13 of the apparatus in the longitudinal direction of the photosensitive drum, is determined.

Further Embodiment

In the first embodiment, the coupling of the photosensitive drum is constituted as a male shaft 17, and the coupling of the main assembly is constituted as a female shaft 18, but the female shaft and the male shaft may be exchanged. In such a case, the same advantageous effects in the rotation accuracy of the photosensitive drum can be provided (FIGS. 23 and 24). In this example, if the tolerable transmission torque of the female shaft of the photosensitive drum is smaller than the tolerable transmission torque of the male shaft of the main assembly, the damage of the male shaft of the main assembly can be prevented.

For example, the female coupling shaft provided in the cartridge is made of polyacetal (POM), and the male coupling shaft constituted in the main assembly is made of zinc die-cast. By doing so, even if an abnormal torque is produced, the damage of the male shaft is prevented since the tolerable transmission torque of the male coupling shaft of the main assembly side is large.

In the above-described embodiment, if a taper is formed at the end portion of the projection 17a or at the inlet portion of the recess 18a or at the both, combination between the projection 17a and the recess 18a is smoother.

In the foregoing, the process cartridge has been described as a cartridge for monochromatic image formation, but it is applicable to a cartridge for forming a multi-color image (two color, three color or full-color image, for example) if a plurality of developing means are used.

As for the developing method, any known methods such as a two-component magnetic brush developing method, a cascade developing method, a touch-down developing method, cloud developing method or the like.

As for the electrophotographic photosensitive member, usable ones include amorphous silicon, amorphous selenium, zinc oxide, titanium oxide, organic photoconductor (OPC) and the like. As for methods for mountings photosensitive material, a photoconductor is evaporated or painted or applied on a cylinder of aluminum alloy or the like.

As for the charging means, a so-called contact type charging method is used in the foregoing examples. However, another method such as corona charging is usable, in which a tungsten wire is enclosed by metal shield of aluminum or the like at three side of the wire, and positive or negative ions are produced by applying a high voltage to the tungsten wire, and the surface of the photosensitive drum is uniformly charged by moving positive or negative ions to the surface.

As for the charging means, blade type (charging blade), pad type, block type, rod type, wire type or the like is usable in addition to the roller type.

As for the cleaning means for removing residual toner from the photosensitive drum, fur brush, magnetic brush or the like is usable, as well as the cleaning blade.

The process cartridge may contain a photosensitive member and at least one of process means. The process cartridge may contain a photosensitive drum and charging means and is made detachably mountable to a main assembly of the apparatus. The process cartridge may contain a photosensitive drum and developing means and is made detachably mountable to a main assembly of the apparatus. The process cartridge may contain a photosensitive drum and cleaning means and is made detachably mountable to a main assembly of the apparatus. The process cartridge may contain a photosensitive drum and at least two process means.

The process cartridge may contain a photosensitive drum and charging means, developing means or cleaning means, and is made detachably mountable to a main assembly of the apparatus. The process cartridge may contain a photosensitive drum and at least one of charging means, developing means and cleaning means, and is made detachably mountable to a main assembly of the apparatus. The process cartridge may contain a photosensitive drum and at least developing means, and is made detachably mountable to a main assembly of the apparatus. Since the process cartridge is detachably mountable to the main assembly of the image forming apparatus by the user, and this means that the maintenance of the apparatus using the process cartridge can be performed by the user by exchanging the process cartridge.

The present invention is applicable to a non-cartridge type image forming apparatus wherein the photosensitive drum, the developing means or the like is directly mounted to the main assembly of the apparatus.

In the foregoing, a description has been provided as to a laser beam printer as an exemplary image forming apparatus, but the present invention is applicable to an electrophotographic copying machine, facsimile machine, word processor or the another image forming machine.

As described in the foregoing, according to the present invention, the rotation accuracy of the driving transmission is improved, so the rotation accuracy of the electrophotographic photosensitive drum has been improved.

Additionally, the driving force can be assuredly transmitted from the main assembly to the electrophotographic photosensitive drum.

Furthermore, when the driving force is transmitted (during image forming operation), the rotation center of the coupling of the main assembly of the apparatus and the coupling of the electrophotographic photosensitive drum can be substantially aligned.

Further additionally, when the driving force is transmitted (during the image forming operation), the electrophotographic photosensitive drum is attracted toward the main assembly side, so that the positional accuracy of the photosensitive member and therefore the process cartridge relative to the main assembly is improved.

Further additionally, when the driving transmission is not carried out (when the image is not formed), the drive transmission coupled state is released, so that the operativity in demounting of the process cartridge is improved. Further additionally, the diameter of the diameter of the coupling portion is small.

While the invention has been described with reference to the structures disclosed herein, it is not confined to the details set forth and this application is intended to cover such modifications or changes as may come within the purposes of the improvements or the scope of the following claims.

What is claimed is:

1. An electrophotographic image forming apparatus for forming an image on a recording material, comprising:

an electrophotographic photosensitive drum;

charging means for charging said photosensitive drum;

developing means for developing a latent image formed on said photosensitive drum into a toner image:

transfer means for transferring the toner image onto the recording material;

fixing means for fixing the toner image on the recording material;

a motor;

a driving rotatable member for receiving a driving force from said motor;

a hole formed substantially at a center of said driving rotatable member, said hole having a polygonal cross-section;

a projection provided at a longitudinal end of said photosensitive drum, wherein when said driving rotatable member rotates with said hole and projection engaged with each other, wherein a rotational driving force is transmitted from said driving rotatable member to said photosensitive drum through said hole and said projection with said projection being pulled into said hole, wherein an end portion of a shaft having said projection and a surface defining said hole are contacted to each other so that said electrophotographic photosensitive drum is positioned in place in a longitudinal direction of said electrophotographic photosensitive drum relative to the main assembly, and said shaft functions to rotatably support said photosensitive drum; and moving means for imparting relative movement between said hole and said projection a longitudinal direction of said electrophotographic photosensitive drum to engage said projection with said hole.

2. An apparatus according to claim 1, wherein said hole is formed in an end of a column projected from a rotational axis of said driving rotatable member, and said projection is projected from an end of said shaft projected outwardly in a rotatable axial direction from said photosensitive drum.

3. An apparatus according to claim 1 or 2, wherein said apparatus further comprises a drum gear of said photosensitive drum, wherein said developing means includes a developing roller, wherein said projection is provided at a drum gear side of said photosensitive drum, and said drum gear functions to transmit the driving force to said developing roller.

4. An apparatus according to claim 3, wherein said driving rotatable member and said drum gear attached to said photosensitive drum are helical gears.

5. An apparatus according to claim 1, further comprising a circular or arcuate wall extending around said projection, wherein said wall functions as a guide for engagement between said hole and projection.

6. An apparatus according to claim 1 or 2, wherein said projection comprises a prism, wherein an outer diameter D1 of said photosensitive drum, an outer diameter F of said shaft and a diameter C of a circumscribed circle of said prism, satisfy:

D1>F≧C.

7. An apparatus according to claim 3, wherein said projection comprises a substantially triangular prism, wherein an outer diameter F of said shaft, a diameter C of a circumscribed circle of said substantially triangular prism, a dedendum diameter G of said drum gear and an inner diameter D2 of said photosensitive drum, satisfy:

G>D2, and G>F≧C.

8. An apparatus according to claim 1 or 5, wherein an outer diameter D1 of said photosensitive drum and dedendum diameter L of a main assembly gear as said driving rotatable member satisfy 1.0×D1≦L≦5.0×D1, approximately.

9. An apparatus according to claim 1 or 5, wherein a main assembly gear as said driving rotatable member has a module of approximately 0.4–0.7 and has a dedendum diameter L of approximately 30–150 mm, and further has 40–400 teeth.

10. An apparatus according to claim 1 or 5, wherein said hole has a substantially triangular cross-section, and said projection has a substantially triangular cross-section, and wherein corners of triangular shape are beveled.

11. An apparatus according to claim 1, wherein said photosensitive drum, said charging means and said developing means are contained in a process cartridge which is detachably mountable to a main assembly of said apparatus.

12. An apparatus according to claim 11, further comprising an openable cover for permitting mounting and demounting of said process cartridge relative to said main assembly, and said moving means is for moving said hole away from said projection in interrelation with opening of said cover, and for moving said hole toward said projection in interrelation with closing of said cover.

13. An apparatus according to claim 1, wherein said hole has a twisted configuration, and said projection is in the form of a substantially polygonal flat plate.

14. A process cartridge detachably mountable to a main assembly of an image forming apparatus, wherein said main assembly includes a motor, a driving rotatable member for receiving a driving force from said motor and a hole formed substantially at a center of said driving rotatable member, said hole having a polygonal cross-section, wherein said process cartridge comprises:

an electrophotographic photosensitive drum;
process means actable on said photosensitive drum;
a projection provided at a longitudinal end of said photosensitive drum, wherein when said driving rotatable member rotates with said hole and projection engaged with each other, a rotational driving force is transmitted from said driving rotatable member to said photosensitive drum through said hole and said projection with said projection being pulled into said hole, wherein an end portion of a shaft having said projection and a surface defining said hole are contacted to each other so that said electrophotographic photosensitive drum is positioned in place in a longitudinal direction of said electrophotographic photosensitive drum relative to the main assembly, and said shaft functions to rotatably support said photosensitive drum.

15. A process cartridge according to claim 14, wherein said projection is in the form of a twisted polygonal prism and is projected from an end of said shaft projected outwardly in a rotational axis direction from said photosensitive drum, and said shaft functions to rotatably support said photosensitive drum in a cartridge frame, and said hole is in the form of a twisted polygon.

16. A process cartridge according to claim 15, wherein said process means includes a developing roller, wherein said shaft is substantially coaxial with a helical gear, and at a side opposite from said shaft, there is provided an engaging portion for engagement with an inner surface of said photosensitive drum, and wherein said projection, said helical gear, said engaging portion and said shaft are of integrally molded resin material, and the helical gear transmits a driving force to said developing roller.

17. A process cartridge according to claim 14 or 16, further comprising a circular or arcuate wall extending around said projection, wherein said wall functions as a guide for engagement between said hole and projection.

18. A process cartridge according to claim 14 or 16, wherein said projection comprises a substantially triangular prism, wherein an outer diameter D1 of said photosensitive drum, an outer diameter F of said shaft and a diameter C of a circumscribed circle of said substantially triangular prism, satisfy:

D1>F≧C.

19. A process cartridge according to claim 14 or 16, wherein said hole has a substantially triangular cross-section, and said projection has a substantially triangular cross-section, and wherein corners of triangular shape are beveled.

20. A process cartridge according to claim 14, further comprising a portion to be urged by a part of the main assembly by a spring and a portion to be contacted to a fixed portion of the main assembly, when said process cartridge is mounted to the main assembly.

21. A process cartridge according to claim 14, wherein said process means includes at least one of charging means, developing means and cleaning means as a unit.

22. A process cartridge according to claim 14, wherein said recess has a twisted configuration, and said projection is in the form of a substantially polygonal flat plate.

23. An electrophotographic image forming apparatus, for forming an image on a recording material, to which a process cartridge is detachably mountable comprising:

a motor;
a driving rotatable member for receiving a driving force from said motor;
a hole formed substantially at a center of said driving rotatable member, said hole having a polygonal cross-section;
means for mounting a process cartridge which includes:

an electrophotographic photosensitive drum;
process means actable on said photosensitive drum; and
a projection provided at a longitudinal end of said photosensitive drum, wherein when said driving rotatable member rotates with said hole and projection engaged with each other, a rotational driving force is transmitted from said driving rotatable member to said photosensitive drum through said hole and said projection with said projection being pulled into said hole, wherein an end portion of a shaft having said projection and a surface defining said hole are contacted to each other so that said electrophotographic photosensitive drum is positioned in place in a longitudinal direction of said electrophotographic photosensitive drum relative to the main assembly, and said shaft functions to rotatably support said photosensitive drum; and moving means for imparting relative movement between said hole and said projection in a longitudinal direction of said photosensitive drum to engage said projection with said hole; and means for feeding the recording material.

24. An apparatus according to claim 23, wherein said shaft is substantially coaxial with a helical gear, and at a side opposite from said shaft, there is provided an engaging portion for engagement with an inner surface of said photosensitive drum, wherein said projection, said helical gear, said engaging portion and said shaft are of integrally molded resin material, and the helical gear transmits driving force to a developing roller as said process means.

25. An apparatus according to claim 23, wherein said process cartridge further comprises a portion to be urged by a part of a main assembly of said electrophotographic image forming apparatus by a spring and a portion to be contacted to a fixed portion of the main assembly, when said process cartridge is mounted to the main assembly.

26. An apparatus according to claim 23, wherein said process cartridge includes at least one of charging means, developing means and cleaning means as a unit.

27. An apparatus according to claim 23, wherein said driving rotatable member and a drum gear of said electrophotographic photosensitive drum are helical gears, said drum gear which is a helical gear, transmitting a driving force to a developing roller as said process means.

28. An apparatus according to claim 23, wherein said photosensitive drum includes a drum gear, wherein said shaft is projected outwardly in a rotational axial direction from said photosensitive drum, and said shaft functions to rotatably support said photosensitive drum in a cartridge frame, wherein said projection comprises a substantially triangular prism, and wherein an outer diameter F of said shaft, a diameter C of a circumscribed circle of said substantially triangular prism, a dedendum diameter G of said drum gear and an inner diameter D2 of said photosensitive drum, satisfy:

G>D2, and G>F≧C.

29. An apparatus according to claim 23, wherein an outer diameter D1 of said photosensitive drum and dedendum diameter L of a main assembly gear as said driving rotatable member satisfy:

1.0×D1≦L≦5.0×D1, approximately.

30. An apparatus according to claim 23, wherein a main assembly gear as said driving rotatable member has a module of approximately 0.4–0.7 and has a dedendum diameter L of approximately 30–150 mm, and further has 40–400 teeth.

31. An apparatus according to claim 23, further comprising an openable cover for permitting mounting and demounting of said process cartridge relative to said main assembly, and said moving means is for moving said hole away from said projection in interrelation with opening of said cover, and for moving said hole toward said projection in interrelation with closing of said cover.

32. An apparatus according to claim 23, wherein said hole has a twisted configuration, and said projection is in the form of a substantially polygonal flat plate.

33. An electrophotographic image forming apparatus for forming an image on a recording material, comprising:
an electrophotographic photosensitive drum;
charging means for charging said photosensitive drum;
developing means for developing a latent image formed on said photosensitive drum into a toner image:
transfer means for transferring the toner image onto the recording material;
fixing means for fixing the toner image on the recording material;
a motor;
a driving rotatable member for receiving a driving force from said motor:
a twisted hole formed substantially at a center of said driving rotatable member said hole having a polygonal cross-section;
a twisted prism projection provided at a longitudinal end of said photosensitive drum, wherein when said driving rotatable member rotates with said hole and projection engaged with each other, a rotational driving force is transmitted from said driving rotatable member to said photosensitive drum through said hole and said projection with said projection being pulled into said hole, wherein an end portion of a shaft having said projection and a surface defining said hole are contacted to each other so that said electrophotographic photosensitive drum is positioned in place in a longitudinal direction of said electrophotographic photosensitive drum relative to the main assembly, and said shaft functions to rotatably support said photosensitive drum; and moving means for imparting relative movement between said hole and said projection in a longitudinal direction of said electrophotographic photosensitive drum to engage said projection with said hole.

34. An apparatus according to claim 33, wherein said hole is formed in an end of a column projected from a rotational axis of said driving rotatable member, and said projection is projected from an end of said shaft projected outwardly in the longitudinal direction of said photosensitive drum.

35. An apparatus according to claim 33 or 34, wherein said hole is formed in an end of a column projected from a rotational axis of said driving rotatable member, and wherein said projection is projected from an end of a shaft projected outwardly in a rotatable axial direction from said photosensitive drum.

36. An apparatus according to claim 35, wherein said developing means includes a developing roller, and wherein said driving rotatable member and a drum gear of said photosensitive drum are helical gears, said helical gears transmitting a driving force to said developing roller.

37. An apparatus according to claim 33, further comprising a circular or arcuate wall extending around said projection, wherein said wall functions as a guide for engagement between said hole and projection.

38. An apparatus according to claim 33 or 34, wherein an outer diameter D1 of said photosensitive drum, an outer diameter F of said shaft and a diameter C of a circumscribed circle of said prism, satisfy:

D1>F≧C.

39. An apparatus according to claim 33 or 34, wherein said twisted prism projection comprises a substantially triangular prism, wherein an outer diameter F of said shaft, a diameter C of a circumscribed circle of said substantially triangular prism, a dedendum diameter G of a drum gear and an inner diameter D2 of said photosensitive drum, satisfy:

G>D2, and G>F≧C.

40. An apparatus according to claim 33, wherein an outer diameter D1 of said photosensitive drum and dedendum diameter L of a main assembly gear as said driving rotatable member satisfy:

1.0×D1≦L≦5.0×D1, approximately.

41. An apparatus according to claim 33, wherein a main assembly side gear as said driving rotatable member has a module of approximately 0.4–0.7 and has a dedendum diameter L of approximately 30–150 mm, and further has 40–400 teeth.

42. An apparatus according to claim 33, wherein said hole has a substantially triangular cross-section, and said projection has a substantially triangular cross-section, and wherein corners of triangular shape are beveled.

43. An apparatus according to claim 33, wherein said photosensitive drum and at least one of said charging means and said developing means are contained in a cartridge which is detachably mountable to a main assembly of said apparatus.

44. An apparatus according to claim 43, further comprising an openable cover for permitting mounting and demounting of said process cartridge relative to said main assembly, and said moving means is for moving said hole away from said projection in interrelation with opening of said cover, and for moving said hole toward said projection in interrelation with closing of said cover.

45. A process cartridge detachably mountable to a main assembly of an image forming apparatus, wherein said main assembly includes a motor, a driving rotatable member for receiving driving force from said motor and a twisted hole formed substantially at a center of said driving rotatable member, said hole having a polygonal cross-section, said process cartridge comprising:

an electrophotographic photosensitive drum;

process means actable on said photosensitive drum; and a twisted polygonal prism projection provided at a longitudinal end of said photosensitive drum, wherein when said driving rotatable member rotates with said hole and projection engaged with each other, a rotational driving force is transmitted from said gear to said photosensitive drum through said hole and said projection with said projection being pulled into said hole, wherein an end portion of a shaft having said projection and a surface defining said hole are contacted to each other so that said electrophotographic photosensitive drum is positioned in place in a longitudinal direction of said electrophotographic photosensitive drum relative to the main assembly, and said shaft functions to rotatably support said photosensitive drum.

46. A process cartridge according to claim 45, wherein said projection is projected from an end of said shaft projected outwardly in a rotatable axis from said photosensitive drum, and said shaft functions to rotatably support said photosensitive drum in a cartridge frame.

47. A process cartridge according to claim 46, wherein said process means includes a developing roller, wherein said shaft is substantially coaxial with a helical gear, and at a side opposite from said shaft, there is provided an engaging portion for engagement with an inner surface of said photosensitive drum, and wherein said projection, said helical gear, said engaging portion and said shaft are of integrally molded resin material, and the helical gear transmits a driving force to said developing roller.

48. A process cartridge according to claim 45 or 47, further comprising a circular or arcuate wall extending around said projection, said wall functions as a guide for engagement between said hole and projection.

49. A process cartridge according to claim 45 or 47, wherein said twisted polygonal prism comprises a substantially triangular prism, wherein an outer diameter D1 of said photosensitive drum, an outer diameter F of said shaft and a diameter C of a circumscribed circle of said substantially triangular prism, satisfy:

D1>F≧C.

50. A process cartridge according to claim 45 or 47, wherein said hole has a substantially triangular cross-section, and said projection has a substantially triangular cross-section, and wherein corners of triangular shape are beveled.

51. A process cartridge according to claim 45, further comprising a portion to be urged by a part of the main assembly by a spring and a portion to be contacted to a fixed portion of the main assembly, when said process cartridge is mounted to the main assembly.

52. A process cartridge according to claim 45, wherein said process means includes at least one of charging means, developing means and cleaning means as a unit.

53. An electrophotographic image forming apparatus, for forming an image on a recording material, to which a process cartridge is detachably mountable comprising:

a motor;

a driving rotatable member for receiving a driving force from said motor;

a twisted hole formed substantially at a center of said driving rotatable member, said hole having a polygonal cross-section;

means for mounting a process cartridge which includes:
an electrophotographic photosensitive drum;
process means actable on said photosensitive drum; and
a twisted polygonal prism projection provided at a longitudinal end of said photosensitive drum, wherein when said driving rotatable member rotates with said hole and projection engaged with each other, a rotational driving force is transmitted from said driving rotatable member to said photosensitive drum through said hole and said projection with said projection being pulled into said hole, wherein an end portion of a shaft having said projection and a surface defining said hole are contacted to each other so that said electrophotographic photosensitive drum is positioned in place in a longitudinal direction of said electrophotographic photosensitive drum relative to a main assembly of said image forming apparatus, and wherein said shaft functions to rotatably support said photosensitive drum; and moving means for imparting relative movement between said hole and said projection in a longitudinal direction of said photosensitive drum to engage said projection with said hole; and means for feeding the recording material.

54. An apparatus according to claim 53, wherein said process means includes a developing roller wherein said shaft is substantially coaxial with a helical gear, and at a side opposite from said shaft, there is provided an engaging portion for engagement with an inner surface of said photosensitive drum, and wherein said projection, said helical gear, said engaging portion and said shaft are of integrally molded resin material, and the helical gear transmits a driving force to said developing roller.

55. An apparatus according to claim 53, further comprising a portion to be urged by a part of a main assembly of said image forming apparatus by a spring and a portion to be contacted to a fixed portion of the main assemble, when said process cartridge is mounted to the main assembly.

56. An apparatus according to claim 53, wherein said process means includes at least one of charging means, developing means and cleaning means.

57. An apparatus according to claim 56, wherein said developing means includes a developing roller, and wherein said driving rotatable member and a drum gear of said photosensitive drum are helical gears, said helical gears transmitting a driving force to said developing roller.

58. An apparatus according to claim 53, wherein said twisted polygonal prism projection comprises a substantially triangular prism, wherein an outer diameter F of said shaft, a diameter C of a circumscribed circle of said substantially triangular prism, a dedendum diameter G of the driving rotatable member of said photosensitive drum and an inner diameter D2 of said photosensitive drum, satisfy:

$G > D2$, and $G > F \geq C$.

59. An apparatus according to claim 53, wherein an outer diameter D1 of said photosensitive drum and dedendum diameter L of a main assembly gear as said driving rotatable member satisfy:

$1.0 \times D1 \leq L \leq 5.0 \times D1$, approximately.

60. An apparatus according to claim 53, wherein a main assembly gear as said driving rotatable member has a module of approximately 0.4–0.7 and has a dedendum diameter L of approximately 30–150 mm, and further has 40–400 teeth.

61. An apparatus according to claim 53, further comprising an openable cover for permitting mounting and demounting of said process cartridge relative to said main assembly, and said moving means is for moving said hole away from said projection in interrelation with opening of said cover, and for moving said hole toward said projection in interrelation with closing of said cover.

62. A process cartridge detachably mountable to a main assembly of an image forming apparatus, wherein said main assembly includes a motor, a driving rotatable member for receiving driving force from said motor and a twisted hole formed substantially at a center of said driving rotatable member, said hole having a substantially triangular cross-section, said process cartridge comprising:

a cartridge frame;

an electrophotographic photosensitive drum;

a developing roller for developing a latent image formed on said photosensitive drum; and a twisted substantially triangular prism projection provided at a longitudinal end of said photosensitive drum, wherein when said driving rotatable member rotates with said hole and projection engaged with each other, a rotational driving force is transmitted from said driving rotatable member to said photosensitive drum through said hole and said projection with said projection being pulled into said hole, wherein an end portion of a shaft having said projection and a surface defining said hole are contacted to each other so that said electrophotographic photosensitive drum is positioned in place in a longitudinal direction of said photosensitive drum relative to the main assembly, and said shaft functions to rotatably support said photosensitive drum; and wherein said projection is projected from an end of said shaft provided substantially coaxial with a drum helical gear for transmitting a rotational force to said developing roller, and wherein said shaft functions to rotatably support said photosensitive drum in said cartridge frame.

63. A process cartridge according to claim 62, wherein at a side opposite from said shaft, there is provided an engaging portion for engagement with an inner surface of said photosensitive drum, wherein said projection, said helical gear, said engaging portion and said shaft are of integrally molded resin material.

64. A process cartridge according to claim 62, further comprising a circular or arcuate wall extending around said projection, wherein said wall functions as a guide for engagement between said hole and projection.

65. A process cartridge according to claim 62 or 63, wherein an outer diameter F of said shaft, a diameter C of a circumscribed circle of said twisted substantially triangular prism projection, a dedendum diameter G of said drum helical gear and an inner diameter D2 of said photosensitive drum, satisfy:

$G > D2$, and $G > F \geq C$.

66. A process cartridge according to claim 62, wherein corners of said projection are beveled.

67. A process cartridge according to claim 62, further comprising a portion to be urged by a part of the main assembly by a spring and a portion to be contacted to a fixed portion of the main assembly, when said process cartridge is mounted to the main assembly.

68. A process cartridge according to claim 62, wherein said process cartridge further contains at least one of a charging roller and a cleaning blade.

69. An electrophotographic image forming apparatus, for forming an image on a recording material, to which a process cartridge is detachably mountable, said image forming apparatus comprising:

a motor;

a driving rotatable member for receiving a driving force from said motor;

a twisted hole formed substantially at a center of said driving rotatable member, said hole having a substantially triangular cross-section;

means for mounting a process cartridge which includes:
a cartridge frame;
an electrophotographic photosensitive drum;
a developing roller for developing a latent image formed on said photosensitive drum; and
a twisted substantially triangular prism projection provided at a longitudinal end of said photosensitive drum, wherein when said driving rotatable member rotates with said hole and projection engaged with each other, a rotational driving force is transmitted from said driving rotatable member to said photosensitive drum through said hole and said projection with said projection being pulled into said hole, wherein an end portion of a shaft having said projection and a surface defining said hole are contacted to each other so that said electrophotographic photosensitive drum is positioned in place in a longitudinal direction of said electrophotographic photosensitive drum relative to a main assembly of said image forming apparatus, and said shaft functions to rotatably support said photosensitive drum; and wherein said projection is provided at an end of a shaft provided substantially coaxial with a drum helical gear for transmitting a rotational force to said developing roller, and wherein said shaft functions to rotatably support said photosensitive drum in said cartridge frame;

moving means for imparting relative movement between said hole and said projection in a longitudinal direction of said photosensitive drum to engage said projection with said hole; and means for feeding the recording material.

70. An apparatus according to claim 69, wherein said shaft is substantially coaxial with said helical gear, and at a side opposite from said shaft, there is provided an engaging portion for engagement with an inner surface of said photosensitive drum, and wherein said projection, said helical gear, said engaging portion and said shaft are of integrally molded resin material, and the helical gear transmits a driving force to said developing roller.

71. An apparatus according to claim 69, further comprising a portion to be urged by a part of a main assembly of said image forming apparatus by a spring and a portion to be contacted to a fixed portion of the main assembly, when said process cartridge is mounted to the main assembly.

72. An apparatus according to claim 69, wherein said process cartridge includes at least one of charging means, developing means and cleaning means as a unit.

73. An apparatus according to claim 69, wherein an outer diameter F of said shaft, a diameter C of a circumscribed circle of said twisted substantially triangular prism projection, a dedendum diameter G of the drum helical gear and an inner diameter D2 of said photosensitive drum, satisfy:

G>D2, and G>F≧C.

74. An apparatus according to claim 69, wherein an outer diameter D1 of said photosensitive drum and dedendum diameter L of a main assembly gear as said driving rotatable member satisfy:

1.0×D1≦L≦5.0×D1, approximately.

75. An apparatus according to claim 69, wherein a main assembly gear as said driving rotatable member has a module of approximately 0.4–0.7 and has a dedendum diameter L of approximately 30–150 mm, and further has 40–400 teeth.

76. An apparatus according to claim 69, further comprising an openable cover for permitting mounting and demounting of said process cartridge relative to said main assembly, and said moving means is for moving said hole away from said projection in interrelation with opening of said cover, and for moving said hole toward said projection in interrelation with closing of said cover.

77. A process cartridge detachably mountable to a main assembly of an image forming apparatus, wherein said main assembly includes a motor, a main assembly helical gear for receiving a driving force from said motor and a twisted hole formed substantially coaxial with said helical gear, said hole having a substantially triangular cross-section, wherein said process cartridge comprises:

a cartridge frame;
an electrophotographic photosensitive drum;
a developing roller for developing a latent image formed on said photosensitive drum;
a cleaning blade for removing residual toner from said photosensitive drum;
a twisted substantially triangular prism projection provided at a longitudinal end of said electrophotographic photosensitive drum, wherein when said main assembly helical gear rotates with said hole and projection engaged with each other, a rotational driving force is transmitted from said gear to said electrophotographic photosensitive drum through said hole and said projection with said projection being pulled into said hole, wherein an end portion of a shaft having said projection and a surface defining said hole are contacted to each other so that said electrophotographic photosensitive drum is positioned in place in a longitudinal direction of said electrophotographic photosensitive drum relative to the main assembly, and said shaft functions to rotatably support said photosensitive drum; and wherein said projection is provided at an end of said shaft provided substantially at a center of a drum helical gear for transmitting a rotational driving force to said developing roller, and wherein said shaft functions to rotatably support said electrophotographic photosensitive drum in said cartridge frame, and wherein said projection, said drum helical gear and said shaft are of integrally molded resin material, and an outer diameter D1 of said electrophotographic photosensitive drum, an outer diameter F of said shaft and a diameter C of a circumscribed circle of said twisted substantially triangular prism projection, satisfy:

D1>F≧C.

78. A process cartridge according to claim 77, wherein at a side opposite from said shaft, there is provided an engaging portion for engagement with an inner surface of said photosensitive drum, wherein said engaging portion is of integrally molded resin material.

79. A process cartridge according to claim 77, further comprising a circular or arcuate wall extending around said projection, wherein said wall functions as a guide for engagement between said hole and projection.

80. A process cartridge according to claim 77, wherein corners of said projection are beveled.

81. A process cartridge according to claim 77, further comprising a portion to be urged by a part of the main assembly by a spring and a portion to be contacted to a fixed portion of the main assembly, when said process cartridge is mounted to the main assembly.

82. An electrophotographic image forming apparatus, for forming an image on a recording material, to which a process cartridge is detachably mountable, said image forming apparatus comprising:

a motor;
a main assembly side helical gear for receiving a driving force from said motor;
twisted hole formed substantially coaxial with said gear, said hole having a substantially triangular cross-section, said hole being formed in an end of a circular column projected from a substantially central portion of said helical gear;
means for mounting a process cartridge which includes:
a cartridge frame;
an electrophotographic photosensitive drum;
a developing roller for developing a latent image formed on said photosensitive drum;
a cleaning blade for removing residual toner from said photosensitive drum; and
a twisted substantially triangular prism projection provided at a longitudinal end of said photosensitive drum, wherein when said main assembly side helical gear rotates with said hole and projection engaged with each other, a rotational driving force is transmitted from said gear to said photosensitive drum through said hole and said projection with said projection being pulled into said hole, wherein an end portion of a shaft having said projection and a surface defining said hole are contacted to each other so that said photosensitive drum is positioned in place in a longitudinal direction of said photosensitive drum relative to a main assembly of said image forming apparatus, and said shaft functions to rotatably support said photosensitive drum; and wherein said projection is provided at an end of a shaft provided substantially coaxial with a drum helical gear for transmitting a rotational force to said developing roller, and wherein said shaft functions to rotatably support said photosensitive drum in said cartridge frame, and wherein said projection, said drum helical gear and said shaft are of integrally molded resin material, and an outer diameter D1 of said photosensitive drum, an outer diameter F of said shaft and a diameter C of a circumscribed circle of said twisted substantially triangular prism projection satisfy:

$D1 > F \geq C$;

an openable cover for permitting mounting and demounting of said process cartridge relative to said main assembly;

moving means for moving said hole away from said projection in interrelation with opening of said cover, and for moving said hole toward said projection in interrelation with closing of said cover to engage said projection with said hole; and means for feeding the recording material; and wherein a dedendum diameter G of said drum helical gear and an inner diameter D2 of said photosensitive drum, satisfy:

$G > D2$, and $G > F \geq C$.

83. An apparatus according to claim 82, wherein said main assembly side helical gear has a module of approximately 0.4–0.7 and has a dedendum diameter L of approximately 30–150 mm, and further has 40–400 teeth.

84. A process cartridge detachably mountable to a main assembly of an image forming apparatus, wherein said main assembly includes a motor, a driving rotatable member for receiving a driving force from said motor and a hole formed substantially at a center of said driving rotatable member, said hole having a polygonal cross-section, wherein said process cartridge comprises:

process means actable on said photosensitive drum;

a plurality of engageable portions engageable to an inner surface of said hole, said engageable portions being provided at and supported by an end of said photosensitive drum, wherein when said driving rotatable member rotates with said hole and engageable portions engaged with each other, a rotational driving force is transmitted from said driving rotatable member to said photosensitive drum through said hole and said engageable portions with said engageable portions being pulled into said hole, wherein an end portion of a shaft having said engageable portions and a surface defining said hole contact each other so that said electrophotographic photosensitive drum is positioned in a plane in a longitudinal direction of said electrophotographic photosensitive drum relative to the main assembly, and said shaft functions to rotatably support said photosensitive drum.

85. A process cartridge according to claim 84, wherein said engageable portions are provided at an outer surface of a projection.

86. A process cartridge according to claim 84, wherein said engageable portions are provided on one side of a drum flange mounted to one end of a cylindrical member of said photosensitive drum.

87. A process cartridge according to claim 84, wherein said drum flange includes a shaft portion rotatably supported on a frame, a gear portion for transmitting a rotational driving force to a developing roller and an engaging portion for engagement with said cylindrical member, said engageable portions are supported by said shaft portion, by which said engageable portions are supported by said photosensitive drum.

88. A process cartridge according to claim 86, wherein said drum flange includes a shaft portion rotatably supported on a frame, a gear portion for transmitting a rotational driving force to a developing roller and an engaging portion for engagement with said cylindrical member, wherein a projection is provided at an end of said shaft portion, and said engageable portions are provided at an outer surface of said projection.

89. A process cartridge according to claim 85 or 88 wherein said projection is in the form of a twisted prism.

90. A process cartridge according to claim 89, wherein said prism has a substantially triangular cross-section.

91. A process cartridge according to claim 90, wherein the triangular cross-section is an equilateral triangular cross-section.

\* \* \* \* \*

UNITED STATES PATENT AND TRADEMARK OFFICE
CERTIFICATE OF CORRECTION

PATENT NO. : 6,240,266 B1
DATED : May 29, 2001
INVENTOR(S) : Kazushi Watanabe et al.

It is certified that error appears in the above-identified patent and that said Letters Patent is hereby corrected as shown below:

Column 2,
Line 17, "a" should read -- of a --.

Column 3,
Line 22, "and" should read -- an --.

Column 4,
Line 31, "fixing-roller" should read -- fixing roller --.
Line 38, "a-manual" should read -- a manual --.

Column 5,
Line 23, "an" should read -- a --.
Line 29, "is" should read -- are --.
Line 30, "15a 15b" should read -- 15a, 15b --.
Line 44, "mounting" should read -- mounted --.

Column 6,
Line 9, "fixed" should read -- fixed to --.
Line 14, "male" should read -- the male --.
Line 23, "more and" should read -- and more --.
Line 26, "shape" should read -- shape, --.
Line 43, "to" should be deleted.

Column 7,
Line 18, "to" should be deleted.
Line 30, "16" should read -- 16 is --.

Column 8,
Line 7, "(approx." should read -- (approximately --.

Column 9,
Line 45, "rollers" should read -- rollers, --.

Column 10,
Line 1, "be contacted to" should read -- contact --.
Line 19, "the-" should read -- the --.
Line 32, "are" should read -- are an --.

Column 11,
Line 31, "is" should be deleted.

UNITED STATES PATENT AND TRADEMARK OFFICE
CERTIFICATE OF CORRECTION

PATENT NO. : 6,240,266 B1
DATED : May 29, 2001
INVENTOR(S) : Kazushi Watanabe et al.

It is certified that error appears in the above-identified patent and that said Letters Patent is hereby corrected as shown below:

Column 12,
Line 33, "material" (1st occurrence) should be deleted.
Line 54, "approx." should read -- approximately --.

Column 13,
Line 23, "3mm)" should read -- 3mm, --.
Line 26, "the" (1st occurrence) should be deleted.

Column 18,
Line 57, "mounted" should read -- mounted on --.

Column 19,
Line 34, "that" should read -- that the --.

Column 20,
Line 63, "insertion" should read -- inserted --.

Column 21,
Line 26, "that" should read -- that a --.
Line 27, "to" should read -- to the --.
Line 33, "a" should be deleted.
Line 64, "he" should be deleted.

Column 24,
Line 29, "recess" should read -- recess of --.
Line 56, "that" should read -- that the --.

Column 27,
Line 15, "mountings" should read -- mounting --.
Line 22, 'by" should read -- by a --.
Line 23, "side" should read -- sides --.

Column 28,
Line 36, "image:" should read -- image; --.

Column 29,
Line 33, "satisfy" should read -- satisfy: --.
Line 67, "drum;" should read -- drum; and --.

UNITED STATES PATENT AND TRADEMARK OFFICE
CERTIFICATE OF CORRECTION

PATENT NO. : 6,240,266 B1
DATED : May 29, 2001
INVENTOR(S) : Kazushi Watanabe et al.

It is certified that error appears in the above-identified patent and that said Letters Patent is hereby corrected as shown below:

Column 32,
Line 14, "image:" should read -- image; --.

Column 34,
Line 65, "roller" should read -- roller, --.

Column 36,
Lines 3 and 67, "drum; and" should read -- drum, --.
Line 42, "motor:" should read -- motor; --.

Column 37,
Line 6, "frame;" should read -- frame; and --.
Line 65, "drum;" should read -- drum; and --.

Column 38,
Line 13, "drum; and" should read -- drum, --.
Line 51, "twisted" should read -- a twisted --.

Column 39,
Line 33, "material; and" should read -- material, --.

Column 40,
Line 1, "drum;" should read -- drum; and --.
Line 25, "84," should read -- 86, --.
Line 29, "member," should read -- member, wherein --.

Signed and Sealed this

Eighth Day of April, 2003

JAMES E. ROGAN
*Director of the United States Patent and Trademark Office*